US009836749B1

(12) United States Patent
Bowman

(10) Patent No.: US 9,836,749 B1
(45) Date of Patent: Dec. 5, 2017

(54) TECHNICAL REGULATION ENFORCEMENT SYSTEM

(71) Applicant: James D. Bowman, Kirkland, WA (US)

(72) Inventor: James D. Bowman, Kirkland, WA (US)

( * ) Notice: Subject to any disclaimer, the term of this patent is extended or adjusted under 35 U.S.C. 154(b) by 0 days.

(21) Appl. No.: 13/842,916

(22) Filed: Mar. 15, 2013

Related U.S. Application Data

(63) Continuation of application No. 12/653,306, filed on Dec. 10, 2009, now abandoned.

(60) Provisional application No. 61/613,411, filed on Dec. 10, 2008.

(51) Int. Cl.
*G06Q 30/00* (2012.01)
*G06Q 10/10* (2012.01)
*G06Q 10/06* (2012.01)
*G06Q 50/08* (2012.01)

(52) U.S. Cl.
CPC .................................. *G06Q 30/018* (2013.01)

(58) Field of Classification Search
USPC ... 705/317, 7.23, 7.12, 301, 315, 7.17, 7.34, 705/7.11, 7.18
See application file for complete search history.

(56) References Cited

U.S. PATENT DOCUMENTS

| | | | | |
|---|---|---|---|---|
| 2002/0167393 | A1* | 11/2002 | Mabuchi et al. | 340/5.3 |
| 2006/0026009 | A1* | 2/2006 | Luhr | G06Q 50/08 705/315 |
| 2006/0252304 | A1* | 11/2006 | Shoop | G01R 31/3277 439/517 |
| 2009/0125283 | A1* | 5/2009 | Conover | G06Q 10/10 703/1 |
| 2009/0157521 | A1* | 6/2009 | Moren | G06Q 10/10 705/1.1 |

\* cited by examiner

*Primary Examiner* — Mark A Fleischer
(74) *Attorney, Agent, or Firm* — Boswell IP Law; J. Mason Boswell

(57) ABSTRACT

A system presented herein, called COMPATH™, incorporates computer technology, computer software and the world wide web to expedite and improve regulation compliance levels, logistics, and communications. Building departments and other regulation enforcement agencies have been historically overtaxed in their ability to systematically enforce regulations such as building codes and ordinances, and lack the means to consistently and effectively communicate with stakeholders. As the number and complexity of these building code regulations have expanded, enforcement agencies continue to lag in their ability to enforce them. The impacts of this lack of capability have been manifested in damage from catastrophic storms and earthquakes and in poor energy code compliance in buildings. Damage from numerous events has been found by forensics studies to be attributable to lax code enforcement.

18 Claims, 30 Drawing Sheets

Flow diagram depicting the
Building Code enforcement
application of the ComPath System

Flow diagram depicting the Building Code enforcement application of the ComPath System

FIGURE 8

Utility: Plan Review Checklist Editor Layout Example  80

Mechanical Systems  72  81  74  75  76  77

1. Heat Pump  73
2. Gas forced-air furnace  78
   1. Minimum AFUE Rating .80
   2. Maximum Output 225,000 BTU/Hr
   3. *Supply Ducts* <Assumed details like these not included here>
   4. *Return Ducts* <Assumed details like these not included here>  71a
3. Electric forced-air furnace
4. Gas Water Heater
5. <All requirements located by the designer>

| Note | Add Back |   | Code |
|------|----------|---|------|
| Note | Included | L-6 | Code |
| Note | Delete | L-6 | Code |
| Note | Delete | L-6 | Code |
| Note | Add Back |   | Code |
| Note | Delete | L-6 | Code |

Filed Revisions Screen

FIGURE 10
Pre-Inspection Assistant — 100
Verify Checklist Prior to Inspection Permit Name: Gerald Coe          Permit: B91011
Address: 123 Smith Road, Lacy, WA     105
Inspection: Energy Only    Location: 3

| | REQUIREMENTS: LOCATION 3 |
|---|---|
| ON / OFF | Combined Inspection Checklist |
| OK NOK Note | Envelope Insulation (*Detailed check off*) |
| OK NOK Note | Glazing (*Detailed check off*) |
| OK NOK Note | HVAC Efficiencies (*Detailed check off*) |
| OK NOK Note | HVAC Duct Sealing (*Detailed check off*) |
| OK NOK Note | Water Heater(s) (*Detailed check off*) |
| OK NOK Note | Efficient Lighting (*Detailed check off*) |

Floor: 1

REQUIREMENTS: TYPICAL ALL LOCATIONS

| | |
|---|---|
| OK NOK Note | Envelope Insulation (*Detailed check off*) |
| OK NOK Note | Air Sealing (*Detailed check off*) |
| OK NOK Note | HVAC Duct Sealing (*Detailed check off*) |
| OK NOK Note | Glazing (*Detailed check off*) |
| OK NOK Note | Moisture Management (*Detailed check off*) |
| OK NOK Note | Ventilation System (*Detailed check off*) |
| OK NOK Note | Water Heater(s) (*Detailed check off*) |
| OK NOK Note | Cool Roofing (*Detailed check off*) |
| OK NOK Note | Service Water Piping Insulation (*Detailed check off*) |

⟨ Back          Call for Framing Inspection          Continue ⟩

ComPath Dashboard

ComPath Dashboard

ComPath Dashboard

FIGURE 16

Inspections: Scheduled — 150

Date: [January 20, 20XX] — 151

Inspection Route Start Time [8:30] 157 — 152

Inspection Route End Time [4:00]

154 Green Rows

Scheduled Inspections for January 1, 2009

| # | Names | Address | Type | Pmt # | Time |
|---|---|---|---|---|---|
| 1 | Billings | 789 Smith Rd | Footing | 91201 | 8:30 |
| 2 | Fort | 123 Jones St | Footing | 90211 | 9:00 |
| 3 | Ryan | 456 Jones St | Footing | 90233 | 9:30 |
| 4 | Coe | 123 Smith Rd | Framing | 91011 | 10:00 |
| 5 | Frank | 456 Smith Rd | Framing | 91012 | 10:30 |
| 6 | Allen | 789 Jones St | Final | 90091 | 11:00 |
| 7 | Boyce | 123 45th Ave | Framing | 91016 | 11:30 |
| 8 | Jensen | 456 45th Ave | Framing | 91015 | 1:00 |
| 9 | Gold | 789 45th Ave | Final | 90076 | 1:30 |
| 10 | Yeh | 23 Wildwood Pl | Framing | 91032 | 2:00 |
| 11 | Benton | 27 Wildwood Pl | Final | 90100 | 2:45 |
| 12 | Bing | 38 Wildwood Pl | Final | 90090 | 3:15 |

Scroll & Change Order

Edit Inspections — 154a

Back      Continue inspection

FIGURE 17
Inspection Verification
Framing Phase Inspection

Permit Name: Gerald Coe  Permit: B91011
Address: 123 Smith Road, Lacy, WA
Inspection: Energy Only  Location: 3

REQUIREMENTS: LOCATION 3

| ON | OFF | Combined Inspection Checklist |
|----|-----|-------------------------------|
| OK | NOK Note | Envelope Insulation (*Detailed check off*) |
| OK | NOK Note | Glazing (*Detailed check off*) |
| OK | NOK Note | HVAC efficiencies (*Detailed check off*) |
| OK | NOK Note | HVAC Duct sealing (*Detailed check off*) |
| OK | NOK Note | Water Heater(s) (*Detailed check off*) |
| OK | NOK Note | Efficient Lighting (*Detailed check off*) |

Floor: 1

REQUIREMENTS: TYPICAL ALL LOCATIONS

| OK | NOK Note | Envelope Insulation (*Detailed check off*) |
|----|----------|--------------------------------------------|
| OK | NOK Note | Air Sealing (*Detailed check off*) |
| OK | NOK Note | HVAC duct sealing (*Detailed check off*) |
| OK | NOK Note | Glazing (*Detailed check off*) |
| OK | NOK Note | Moisture management (*Detailed check off*) |
| OK | NOK Note | Ventilation System (*Detailed check off*) |
| OK | NOK Note | Water Heater(s) (*Detailed check off*) |
| OK | NOK Note | Cool Roofing (*Detailed check off*) |
| OK | NOK Note | Service Water piping Insulation (*Detailed check off*) |

◀ Back ———— Continue inspection ▶

FIGURE 18

Inspection Verification
Framing Phase Energy — 170

Permit Name: Gerald Coe    171    Permit: B91011
Address: 123 Smith Road, Lacy, WA    172

Inspection [Energy Only]    Location [3]

DETAILED: DUCT AIR SEALING — 173

174  175    163    176    167a

Floor [1]

[OK|NOK|Note] (Details)
[OK|NOK|Note] (Details)
[OK|NOK|Note] (Details)
[OK|NOK|Note] (Details)

[OK|NOK|Note] (Details)
[OK|NOK|Note] (Details)
[OK|NOK|Note] (Details)
[OK|NOK|Note] (Details)

[OK|NOK|Note] (Details)
178

177

◀ Back    Continue inspection ▶

FIGURE 19

Framing Phase: Energy — 180

Permit Name: Gerald Coe  Permit: B91011
Address: 123 Smith Road, Lacy, WA — 181
Inspection Energy Only  Location 3

①OK ✓  Exterior
      Under floor
②NOK ✓  F③A

DETAILED: DUCT AIR SEALING — 182

Floor 1

| OK | NOK | Note |
Ducts sealed at all intersecting joints (Red Lines) in the ducts, air plenums, return air ducts, duct-to-ceiling and duct-to-floor penetrations with Approved duct mastics, but not duct tape.

| OK | NOK | Note | — 185
Duct Air Test Certification from Contractor
(Email Form to permit holder) — 186  181

Important Quality Control Details  — 183

184

187

189
Building Code Requirements
Duct sealing commentary — 180a
Provide Inspector feedback — 181a ◀ Back            Continue inspection ▶

Automatically Generated Inspection Note

FIGURE 22
Inspection Verification
Framing Phase: Glazing Detail

Permit Name: Gerald Coe  Permit: B91011
Address: 123 Smith Road, Lacy, WA

Inspection [Energy]  Location [3]

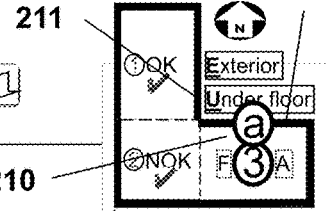

DETAILED: GLAZING

[All Glazing this Location OK]  Floor [1]

WALL (a) SCHEMATIC BOUNDARIES LEFT TO RIGHT

| OK NOK Note (Recalc) | OK NOK Note (Recalc) | OK NOK Note (Recalc) | OK NOK Note (Recalc) |
|---|---|---|---|
| Pella ✓ 4ox5o U.45 SHGC .30 | Pella ✓ 4ox6o U.45 SHGC .30 | Pella ✓ 4ox5o U.45 SHGC .30 | Pella ✓ 4ox5o U.45 SHGC .30 |

[All Glazing this location OK]

| ON OFF | Combined Inspection Checklist |
| OK NOK Note | Building Envelope Air Sealing (*Detailed check off*) |
| OK NOK Note | HVAC Duct sealing (*Detailed check off*) |
| OK NOK Note | Water Heater (*Detailed check off*) |
| OK NOK Note | Efficient Lighting (*Detailed check off*) |

⟨ Back          Continue ⟩

FIGURE 23
Inspection Verification
Framing Phase Glazing Detail

Permit Name: Gerald Coe  Permit: B91011
Address: 123 Smith Road, Lacy, WA

Inspection  Energy  Location  3

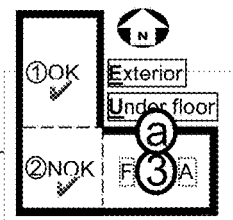

DETAILED: GLAZING

All Glazing this Location OK   220c

Floor  1

⇦ WALL ⓐ SCHEMATIC BOUNDARIES LEFT TO RIGHT ⇨

| OK NOK Note (Recalc) | OK NOK Note (Recalc) | OK NOK Note (Recalc) | OK NOK Note (Recalc) |
|---|---|---|---|
| Pella ✓ 4ox5o U.45 SHGC .30 | Pella ✓ 4ox6o U.45 SHGC .30 | Pella ✓ 4ox5o U.45 SHGC .30 | Pella ✓ 4o5o U.45 SHGC .30 |

MFR.      Unknown
Tested    Unlisted
Panes     — 2
Frame     — Wood
Length    — 4'- 0"
Width     — 5'- 0"
Uo        — .090
SHGC      Type Value
Overall Glazing  PASS

221

222

◀ Back                            Continue ▶

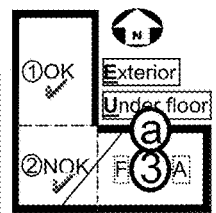

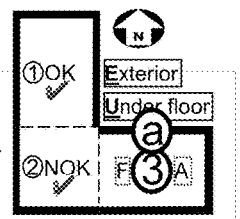

FIGURE 26

Inspection Verification
Framing Phase: New Glazing Detail

Permit Name: Gerald Coe    Permit: B91011
Address: 123 Smith Road, Lacy, WA

Inspection [ Energy ⇩ ]   Location [ 3 ⇩ ]

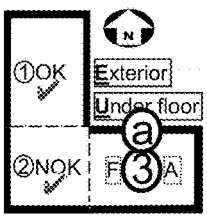

Energy: Glazing

[ All Glazing this Location OK ]

Floor [ 1 ⇩ ]

WALL ⓐ SCHEMATIC BOUNDARIES LEFT TO RIGHT

| OK NOK Note (Recalc) | OK NOK Note (Recalc) | OK NOK Note (Recalc) | OK NOK Note (Recalc) |
|---|---|---|---|
| Pella ✓ 4ox5o U.45 SHGC .30 | Pella ✓ 4ox6o U.45 SHGC .30 | Pella ✓ 4ox5o U.45 SHGC .30 | Pella ✓ 4o5o U.45 SHGC .30 |

MFR.    [ Unknown ⇩ ]
Tested  [ Unlisted ⇩ ]
Panes   [ NFRC ]
Frame   [ AAMA ]
Length  [ 4'- 0" ⇩ ]         — 250
Width   [ 5'- 0" ⇩ ]         — 251
Uo      [ .090 ⇩ ]
SHGC    [ Type Value ⇩ ]
Overall Glazing  [ PASS ]

◀ Back                               Continue ▶

Approval Records Screen

FIGURE 28

City of Paradise

| | | |
|---|---|---|
| Inspector | Ed Smith | |
| Email | Ed_Smith@paradise.ci.org | |
| Permit | 98890 | *English Language* |
| Address | 123 Adams Lane, Paradise, WA | *equivalent checklist* |
| Company | Ideal Construction Company, Inc. | *for the contractor* |
| Contact | John Doe | |

IMPORTANT NOTICE
The following report provides a detailed list of deficiencies that must comply as indicated prior to cover and prior to calling for reinspection. As each item is competed, click on the corresponding check box. When all are check, click on the "call for Reinspection" button and follow the steps to request a reinspection. Reinspection requests will not be processed without following this online process or by submitting a completed paper form.

Contractor Pre-Framing Phase Compliance Verification

Building (2006 International Residential Code + Ordinances)
1. Holdowns in locations 1, 2 are not properly tensioned in location 8 (?) (Product Listing)
2. Roof to wall connector plates not present in Locations 2, 3, 4, 5 (?) S. xxx
3. Roof nailing in Zone 4, Locations All, short nailed (3P/6F) (?) S. xxx
4. Wall sheathing nail missed in Location 5 (?)

Energy (2006 International Residential Code)
1. All wall insulation batts are compressed and must be face stapled (?) S xxx
2. Air sealing at partition to exterior walls incomplete wall locations 3, 5, 7, 9 (?) S. xxx
3. Bath fan duct must be hard connected to roof jack (?) S. xxx
3. Glazing labels were removed prior to inspection. Must provide verification (?) S. xxx

Plumbing (2006 International Residential Code)
Approved

Mechanical (2006 International Residential Code)
Approved

INSPECTORS NOTE:
Explained deficiencies to John Doe, project lead, on site. He will provide completed department glazing verification form signed by architect, supplier and contractor.

[The system reformats and exports this report to a master record of all inspection results for for this permit, which in turn, is included in a folder of all records for this address and other key searchable parameters]

Request Re-inspection

FIGURE 29

City of Paradise

| | |
| --- | --- |
| Inspector | Ed Smith |
| Email | Ed_Smith@paradise.ci.org |
| Permit | 98890 |
| Address | 123 Adams Lane, Paradise, WA |
| Company | Ideal Construction Company, Inc. |
| Contact | John Doe |

*English Language equivalent checklist for the contractor*

IMPORTANT NOTICE
The following report provides a detailed list of deficiencies that must comply as indicated prior to cover and prior to calling for reinspection. As each item is competed, click on the corresponding check box. When all are check, click on the "call for Reinspection" button and follow the steps to request a reinspection. Reinspection requests will not be processed without following this online process or by submitting a completed paper form.

Subcontractor Pre-Framing Phase Compliance Verification

Building  (2006 International Residential Code + Ordinances)
1. Holdowns in locations 1, 2 are not properly tensioned in location 8 (?) (Product Listing)
2. Roof to wall connector plates not present in Locations 2, 3, 4, 5 (?) S. xxx
3. Roof nailing in Zone 4, Locations All, short nailed (3P/6P) (?) S. xxx
4. Wall sheathing nail missed in Location 5 (?)

Energy  (2006 International Residential Code)
1. All wall insulation batts are compressed and must be face stapled (?) S xxx
2. Air sealing at partition to exterior walls incomplete wall locations 3, 5, 7, 9 (?) S. xxx
3. Bath fan duct must be hard connected to roof jack (?) S. xxx
3. Glazing labels were removed prior to inspection. Must provide verification (?) S. xxx

Plumbing  (2006 International Residential Code)
Approved

Mechanical  (2006 International Residential Code)
Approved

INSPECTORS NOTE:
Explained deficiencies to John Doe, project lead, on site. He will provide completed department glazing verification form signed by architect, supplier and contractor.

[The system reformats and exports this report to a master record of all inspection results for for this permit, which in turn, is included in a folder of all records for this address and other key searchable parameters]

OK for Contractor

FIGURE 30

City of Paradise (Город Рая)

| | |
|---|---|
| Инспектор | Ed Smith |
| Электронная п | Ed_Smith@paradise.ci.org |
| Разрешения | 98890 |
| Адрес | 123 Adams Lane, Paradise, WA |
| נאם קבלן | Ideal Construction Company, Inc. |
| контакт: | John Doe |

*For Russian Speaking Sub-Contractors*

ВАЖНОЕ УВЕДОМЛЕНИЕ

Следующий доклад содержит подробный перечень недостатков, которые необходимо соблюдать, как указано до покрова и до вызова для reinspection. Как соревновались каждому пункту, нажмите на соответствующий флажок, когда все проверки, нажмите на "призыв к Reinspection кнопка" и следуйте инструкциям по запросу reinspection. Reinspection просьбы не будут обработаны без Вслед за этим процессом онлайн или представления завершила бумажной форме.

Субподрядчик Контрольная проверка

Энергия     2006 International Residential Code (2006 Международный Жилой код)

1. Все Batts утепление стен сжимаются и должен быть лицом сшиваются (?) S xxx
2. Воздушные уплотнений в раздел для наружных стен 3, 5, 7, 9(?) S. xxx
3. Ванная вентилятор протока должна быть связана кой крышей Джек (?) S. xxx
3. Остекление этикетки были удалены до проведения инспекции. (?) S. xxx

[ ОК для подрядчика ]

US 9,836,749 B1

TECHNICAL REGULATION ENFORCEMENT SYSTEM

CROSS-REFERENCE TO RELATED APPLICATIONS

The present application is a continuation of U.S. patent application Ser. No. 12/653,306 entitled "TECHNICAL REGULATION ENFORCEMENT SYSTEM", and filed on 2009 Dec. 10, which claims the benefit of U.S. Provisional Patent Application No. 61/201,537 filed on 2008 Dec. 10, each of which is hereby incorporated by reference.

FIELD

The present invention relates to a computing system, software, network, and other technology that streamlines the processing of incorporating complex building codes, specifications, design details, and ordinances into a useable and efficient form for field personnel who are charged with ensuring that these intended provisions are manifested in buildings or other structures at key inspection phases during construction or renovation and, more particularly, incorporating handheld computing systems, networks, and other technology that orchestrate the efficient, real-time overall regulated compliance process, educate its users, and make all stakeholders accountable for their actions.

BACKGROUND

Over the past century, we have witnessed many natural disasters and the destruction they have wrought around the world and in the US. Hurricanes Katrina, Gilbert and the Northridge, California earthquake are representative examples. These and other events have cost untold billions of dollars in damage to buildings from wind, earthquakes, flooding, poor indoor air quality and lesser recognized impacts from poor building construction and lost energy efficiency. A central underlying factor in this damage is the lack of a credible and systematic building code enforcement system that can be employed in the field by jurisdiction and special building inspectors. This has been exacerbated by the lack of a system that engages and makes accountable other stakeholders such as builders, designers, and jurisdiction support personnel.

An additional problem is the lack of a technological means to streamline ancillary tasks performed by inspectors, jurisdiction support personnel, designers and contractors that consume time that could otherwise be dedicated to inspection functions. Stakeholders have never had an efficient way of completing building code compliance activities in a systematic, consistent manner with a clearly defined set of expectations and a system that eliminates confusion and targets the specific requirements for each unique building design.

Poor energy code compliance is a widely recognized and unsolved problem in the U.S. quest for reducing dependence on foreign petroleum supplies. All U.S. States currently have a legislative mandate to achieve 90% energy code compliance levels in the near term and no means to achieve that level of compliance without an efficient technology system.

Past solutions are marginal but represented as follows:
Plans and specifications that are approved by the local governmental jurisdictions and required to be on-site at the time of inspections.
Paper compliance forms that consist of code compliance checklist items for each building.
Compliance placards that signify compliance with some aspects of inspection approval.

None of these solutions comprehensively addresses the problem of code enforcement and this has been documented by numerous forensics reports describing the lack of actual building code compliance in buildings using the aforementioned solutions.

In the past and to this day, inspectors routinely travel to the job site with a permit and set of plans, which are then used to haphazardly check building details during a very limited inspection time window. The result was and is a cursory check that is often based more on the inspector's general code knowledge and less on important detailed requirements that are critically important to integrity of building code compliance associated with and in the specific building design.

It is wrongly assumed that many of the engineering details are reasonably left to the engineer and the contractor to verify. Very seldom does this get accomplished because the engineer is not compensated for this service by the owner and the contractor is not interested because he/she is not held accountable by the over-worked inspector for incorporating these details. Contractors often have a disincentive to include these overlooked details because of added savings, which can enhance project profits. In addition, many residential and small commercial projects do not have engineers and the associated oversight they might bring to these projects.

No existing system provides a rapid, customized check-off protocol for ensuring that all of these essential code details are incorporated and verified as compliant in new buildings. Credible levels of inspection scrutiny are not enforced by any existing system nor does any system economize time spent for logistical tasks of the inspection such that he/she can dedicate more time to actual inspections.

Some of the tasks associated with building inspections include repetitive note taking, trying to communicate with contractors and homeowners, driving to and from inspections, organizing technical inspection details, looking up code requirements, and other duties that are not effectively automated.

Other solutions are inconsistent in all areas of concern because the inspection and compliance processes are very loosely defined because of an absence of automation in detailed tasks of inspection, plan review, staff, and other stakeholder duties. Due to the lack of a comprehensive system that directly addresses code enforcement by field inspectors, building department jurisdictions are simply less effective in serving the public.

Field enforcement is consistently inconsistent in jurisdictions of all sizes because audit mechanisms to check inspector, contractor, and designer performance are non-existent, with an inherent lack of specific scripts for performing the duties of code enforcement at a technically adequate level.

Contractors and subcontractors currently have no credible tools for being held consistently accountable for detailed compliance verification with building codes and ordinances and clearly do not have a means for knowing what to do and efficiently participate in the code compliance process.

Currently, hand-held computing device systems are underutilized as a tool that can allow field inspectors and contractors to check off items from an electronic code compliance checklist that pertain to particular jobs and inspection locations within buildings.

No efficient system exists for communicating between the project design professional, contractor, and jurisdiction in a real-time, efficient manner at the point of inspection in terms of approvals or disapprovals.

In the past and present, inspections have been scripted by individual codes and specific topic areas within those codes, and were not efficiently grouped to include all requirements by inspection location as well as responsibility of the inspector.

No system allows the inspector to move efficiently through a building based on inspecting only those required provisions that are relevant to a specific area.

No system reorganizes what may have seemed like disorganized but relevant inspection checklist items for a specific area, into an inspection report that is cohesively organized by specific codes and requirements within those codes, and then have the results filed and delivered to contractor in hard copy form and/or e-mail using the wireless/Wi-Fi communications capacity of handheld computing systems.

No system has comprehensively organized overall inspection, contractor, designer, and jurisdiction staff functions with the objective to minimize time spent on logistics and maximize time for field inspection.

No system allows the audit of detailed inspection and compliance records by inspection requirement detail, making contractors, designers, and inspection personnel accountable, via audits, for their actions or lack thereof.

No systems have incorporated technology such as dictation, photos, voice files, and pre-defined, context-sensitive inspection report text, code requirement hyperlink indexing, real-time communications with stakeholders, and electronic filing of inspection results.

No system incorporates technology that locates each inspection and its requirements by manageable, step-by-step, hyperlinked locations, where each of the location hyperlinks combine to represent the overall building plan schematics.

No system has required the active participation and accountably of the contractor and sub-contractors with a system requiring their participation and detailed verification of code compliance.

No system generates checklists that direct non-English-speaking subcontracting personnel to follow job-specific codes and specifications.

No existing system educates users in very specific, context-driven technical content that relates to each building code requirement or detail project specification.

SUMMARY

Inspector and Associated Interfaces

It is an object of the invention to automate the inspection process such that it efficiently scripts detailed inspection details and verification by all stakeholders in code compliance through the completion of the project.

It is an object of the invention to provide an automated report maker for inspectors.

It is an object of the invention to provide two optional navigation screens on the hand-held computing system for field enforcement inspectors, one that has a list of hyperlinks to system functions and a second that has a series of buttons in the form of a dashboard with bigger buttons to access the same functions, better accommodating the larger fingers of users.

It is an object of the invention to duplicate the hardware and system capability to react to finger touch, stylus and keyboard input command, functions, and other actions with voice activation technology.

It is an object of the invention to have one of the navigation screens have buttons that are activated by depressing by touch and while holding down the button, slide the finger over a field that is activated, and make selections from a list that is highlighted as the pressure is applied to the surface and selected by lifting the finger.

It is an object of the invention to include a product database accessible to defined users of the system.

It is an object of the invention to allow the inspector to customize system options for particular codes/requirements, hours of work, personal identification, and other parameters that do not affect the content of the compliance checklist requirements.

It is an object of the invention to provide an inspection protocol that prioritizes important inspection details and provides technical support at the level required by the inspector to fully understand the requirements and underlying technical merits.

It is an object of the invention to educate inspectors and stakeholders with context-accessible commentary for each inspection requirement in any set of inspection requirements.

It is an object of the invention to educate inspectors and stakeholders with building code commentary accessible through keyword searches.

It is an object of the invention to use computing systems, personal digital assistants (PDA's), global positioning systems (GPS), digital cameras, cell phones, printers, system software, audio recorders, web content, intranets, the Internet, technical resources, and other technology tools to manage the regulatory process.

It is an object of the invention to incorporate PDA's and other field computing equipment having direct or wireless Internet connection capability to revise or download files critical to project-specific field inspections including but not limited to communications, directions, checklists, compliance verification, and other field tasks. This utility can move and utilize files and applications on the fly. Additional system-specific capability will be built-in to the COM-PATH™ system as required.

It is an object of the invention to efficiently ensure that buildings comply with building, fire, energy, plumbing, mechanical, electrical, urban wildfire interface and other codes and building standards to an extent not possible with existing systems.

It is an object of the invention to empower inspectors to enforce complex earthquake, wind and fire (life safety) green building and energy codes, standards, rating systems and programs in the most comprehensive, accountable, and timely way devised to date.

It is an object of the invention to mitigate a prevalent and enduring problem of code deficiencies that have been consistently exposed in post-earthquake and post-hurricane building forensics investigations.

It is an object of the invention to provide an interface to the building official and jurisdiction staff to confirm the project status and provide access to all project records through design, approval, inspections, and project completion.

It is an object of the invention to input and allow easy access by stakeholders of jurisdiction information, including inspection records, deemed appropriate by public policy.

It is an object of the invention to provide an inspection route finder based on a GPS system address locator and associated travel information.

It is an object of the invention to allow users to set, filter availability and times, and edit inspection appointments.

It is an object of the invention to provide an inspection request utility for the public that builds in certain prerequisite steps to be performed by the requester.

It is an object of the invention to empower inspectors and building code enforcement staff to economize many duties that take time away from the efficient use of time and travel, allotting more time for the actual inspections and the critical details that must be checked.

It is an object of the invention to organize the routes of the inspectors to maximize driving efficiency.

It is an object of the invention to calculate and estimate travel and inspection times and give the inspector a real-time estimate of the inspections that can be completed considering the inspection types and distances traveled.

It is an object of the invention to automate and minimize inspector time allotments to establishing efficient time and travel routes for inspections and providing computed routes for each inspection stop.

It is an object of the invention to incorporate voice recognition technology to greatly streamline inspector communications by direct attachment and text conversion to text-based reports and other communications.

It is an object of the invention that the notation and report generator incorporate voice recognition to convert voice dictation to notes/inspection report text or audio files.

It is an object of the invention to provide a context-driven utility function to access maps of any inspection locations that are needed.

It is an object of the invention to provide building plan schematics that visually show and are activated by users to invoke inspection screens with checklist elements that are specifically required for that portion of the structure.

It is an object of the invention to provide a customized inspection sequence for each structure and a corresponding inspection checklist for each observable area as the inspector systematically moves through the building being guided by the screens in the COMPATH™ system.

It is an object of the invention to provide inspection checklist items that are customized for each portion of a building or area.

It is an object of the invention that as each checklist item is activated, it reveals associated approval and disapproval hyperlink buttons.

It is an object of the invention to provide access to all codes, ordinances, and interpretation databases that are adopted and in effect in a jurisdiction.

It is an object of the invention to provide simplified protocols for invoking automated correction notes that are compiled into inspection reports, using communications via web and other means.

It is an object of the invention that when the checklist item disapproval button is depressed, it invokes the checklist note-taking screen.

It is an object of the invention that the checklist note-taking screen effectively appears when disapproval of a checklist item occurs and the inspector is prompted to make a note.

It is an object of the invention to provide a notation system that has a series of pre-written pull-down messages that can be selected for inclusion in the inspection note or report.

It is an object of the invention to provide an inspection report generator that compiles all of the disapproval notes into a preconfigured report that includes inspection type(s), approvals, disapprovals, deficiency details, code references, explanations, contact, follow-up instructions and other pertinent information and directions.

It is an object of the invention to incorporate into checklist items hyperlink buttons for the corresponding regulation section number(s) and language, interpretations and commentary explaining the language, and hyperlinked references for further resource information.

It is an object of the invention to provide searchable access to building official association databases of code interpretation questions that have been discussed on code official list serve e-mail lists such as that maintained by the Washington Association of Building Officials.

It is an object of the invention to automatically tag correction notices of any item with relevant code sections that systematically solve long-standing and contentious "show me the code section" requests from designers, contractors and others.

It is an object of the invention to systematically require the inspector to check all code and ordinance requirements and provides a touch-screen system for rapidly checking off details.

It is an object of the invention to provide a real-time, web-based communications link between the inspector, other building department staff, and the design/construction team.

It is an object of the invention to minimize inspector efforts in organizing and responding to communications from design/construction stakeholders.

It is an object of the invention to eliminate extraneous code requirements and checklist items that do not pertain to a particular project.

It is an object of the invention to provide built-in flexibility to accommodate the specific needs of a jurisdiction to tailor protocols to their own needs (The detail level is defined by specified tiers of requirements defined by the authority having jurisdiction for the COMPATH™ system).

It is an object of the invention to provide an excellent platform for any enforcement activity where many factors and databases of information must be efficiently managed and accessed in the field and made available through at a central server. Homeland Security and related security functions would have applications where the COMPATH™ system could prove very effective.

It is an object of the invention to bring higher levels of code enforcement and process organization to jurisdictions of any size that are particularly challenged in this area.

It is an object of the invention to use the COMPATH™ system for audits of enforcement performance and work output.

It is an object of the invention to provide a checklist note screen that appears when a disapproval of a checklist item occurs and prompts the inspector to make a note.

It is an object of the invention to have a notation system that includes a series of pre-written pull-down message fields crafted by the department and embellished by the inspector due to particular circumstances. These will drill-down on large volumes of potential responses with minimum effort.

It is an object of the invention to provide a utility that allows direct editing of the pull-down messages in the notation system.

It is an object of the invention to provide a spell-check capability for the notation system.

It is an object of the invention to use hand-held computing equipment with the capability to take pictures that reference to the hyperlink and inspection requirements being invoked at any specific point in the inspection.

It is an object of the invention to allow insertion and referencing of photos to specific requirements or comments in emails, reports, and records.

It is an object of the invention to provide the capability to append and reference digital pictures to inspection deficiencies in emailed reports to project stakeholders.

It is an object of the invention to add the capability to upload into the system referenced photos from digital cameras and through wireless or direct connections to the PDA, computers, and network or by other means.

It is an object of the invention to provide a notation system with an e-mail utility that is shared with the report generator that may send e-mail to any of the project stakeholders.

It is an object of the invention to provide a readily accessible e-mail address database that includes all of the stakeholders for each permitted project.

It is an object of the invention that for each set of checklist items, corresponding to predefined inspection locations, having a control that requires each checklist item to either be approved or disapproved prior to having the system identify the checklist set as being completely inspected.

It is an object of the invention to incorporate building plan schematics that are made up of a series of graphic hyperlink segments that in-turn conform to different inspection observation areas in the building.

It is an object of the invention to that for each building plan schematic segment, the inspection of checklist items will result in a visual means of designating approval or disapproval, which is designated through color change and/or text identification.

It is an object of the invention to provide that each observation area or separate hyperlink represented by a portion of a given building plan schematic groups all of the checklist items that are required for that particular inspection. For all of the hyperlinks in the schematic that collectively comprise an inspection, the scope of an inspector's responsibilities is restricted to the jurisdiction defined inspection type and the checklist items. The overall scope of these requirements and how many different codes they cover are determined by the authority having jurisdiction.

It is an object of the invention to include building plan schematics that are broken into a series of smaller hyperlinks that correspond to inspection viewpoints, each of which is successively touch-activated as the inspector moves in an efficient path through the building.

It is an object of the invention to maintain a visual context represented by building schematics that reasonably represents the building plan design drawings.

It is an object of the invention to allow that building hyperlinks be represented in whole or by portions of walls, floors, roofs, or other significant building elements.

It is an object of the invention that when activated, each of these hyperlinks reveals associated inspection checklist items and scripted tasks that the inspector must respond to prior to activating the next hyperlinked segment.

It is an object of the invention that scripted tasks include but are not limited to approvals, disapprovals, note taking, photo taking, research, emails, and reporting.

It is an object of the invention to organize, capture, and verify compliance with a high volume of very complex regulations or design elements using a graphics-based system.

It is an object of the invention to ensure adequate attention to the most detailed requirement yet retaining an overall visual context with the corresponding component location within the building.

It is an object of the invention to provide a level of inspection detail that is adjustable by the system administrator to reflect policy of the department or mandates from the authority having jurisdiction. An audit control will assign a tracking mechanism for the level of detail that was selected for all inspections, making the authority having jurisdiction accountable for the level of detail that is selected. If the political climate for this feature is a market impediment and is not required by the authority having jurisdiction, it can be incapacitated but the system will qualify inspections performed under these conditions. This adjustability feature accommodates political and program mandates that may vary by jurisdiction and/or that evolve over time as the enforcement climate changes.

Contractors and Sub Contractors

It is an object of the invention to include a product database accessible to defined users of the system.

It is an object of the invention to provide a contractor interface that provides department information, check off compliance lists, reports, inspection results, and electronic communications with design/enforcement stakeholders.

It is an object of the invention to provide a sub-contractor interface that provides department information, check off compliance lists, reports, inspection results, and electronic communications with contractor.

It is an object of the invention for the system to generate code-compliance, check-off lists for the contractor to verify that all of the code required items are in compliance prior to calling for a jurisdiction inspection.

It is an object of the invention to provide a pre-inspection check-off list to the contractor that organizes, captures and verifies compliance with a high volume of potentially very complex regulations or design elements using a graphics-based system that helps ensure adequate attention to the smallest detail yet retains overall context with different regulation types and locations of these elements in the design.

It is an object of the invention to generate illustrated, sub-contractor building detail directions and checklists that direct individuals doing specific tasks how to meet the approved plan and specification requirements for their area of responsibility. These directions are produced in the prevailing languages of English and non-English-speaking workers, which may include but are not limited to Spanish and Russian.

It is an object of the invention to make subcontractors responsible for verifying their own work against specific directions and requirements, and submitting them to the contractor, who will in turn need to verify compliance to the jurisdiction prior to calling for inspections; This greatly enhances the probable success of the inspections and appeals to contractors because it ensures better work by subcontractors and minimizes customer callbacks and the time wasted on re-inspections for which the contractor is responsible.

It is an object of the invention to facilitate a direct connection between the contractor's PDA and/or field computing equipment through a wireless capability to revise or download files critical to project-specific, field check-off verification of regulation requirements plus communications, compliance approvals, scheduling, and other field tasks. The system has capabilities similar in some ways to those of AVANTGO™, PALM™, and DOCUMENTS-TO- GO™ to move and utilize files and applications on the fly. Additional capability will be built in to the systems as required.

It is an object of the invention to invoke the PDA and/or computer-based COMPATH™ system interface as a direct and convenient means for the contractor to respond to inspection results and otherwise communicate with inspectors and other jurisdiction personnel.

It is an object of the invention that the system will provide built-in protocols and contact information that streamline repetitive e-mail elements and other redundant communications tasks through pre-configuration.

It is an object of the invention to automate and minimize contractor efforts in organizing and responding to communications from jurisdiction personnel and other stakeholders with an inspection report response system that can be efficiently emailed and/or printed out for design/construction stakeholders.

It is an object of the invention to provide the contractor with a verification checklist of items that are customized into "bite Sized" portions for each building element or area being inspected, using the checklist requirements.

It is an object of the invention to provide building plan schematics that visually show and are activated by contractors to invoke check off requirement screens with checklist elements that are required for that portion of the structure.

It is an object of the invention to list check-off requirement items with corresponding checkboxes so that the contractor can perform a pre-inspection of all items that will be present on the inspector's checklist with the same items.

It is an object of the invention that each check off item has an associated note screen that can form the basis of an e-mail to the inspector or jurisdiction automatically referencing the corresponding requirement.

It is an object of the invention to manually add input to pull-down, pre-written messages of the notation system.

It is an object of the invention that check off list items have hyperlink buttons for the corresponding regulation section number(s) and, depending on access to licensed resources may include language; interpretations and commentary explaining the language and further hyperlinked references for further resource information.

It is an object of the invention that the check off list has controls that require all check off items to either be checked as complete or modified by subsequent department approval.

It is an object of the invention that subsequent jurisdiction check-off list approvals denoted in the previous comment are documented in the check-off list with date, approving authority and other pertinent information.

It is an object of the invention that the completed contractor check-off list may be compiled into a report that is submitted to the jurisdiction and is intended as a prerequisite to the jurisdiction inspection of the check off list items.

It is an object of the invention a building plan schematic, much like the inspector schematic in concept, is made up of a series of graphic hyperlink segments that conform to different check off list observation areas in the building.

It is an object of the invention that each observation area or separate hyperlink in one of the building plan schematic groups all of the check off list items that are required for that particular area of a contractor's pre-inspection review. For all of the hyperlinks in the schematic that collectively comprise a pre-inspection review, the scope of a contractor's responsibilities is restricted to the jurisdiction-defined inspection type and the check-off list items. The overall scope of these requirements and how many different codes they cover are determined by the jurisdiction.

It is an object of the invention that each building plan schematic segment in the building, following contractor check offs, has a visual means of indicating completion, incompletion or jurisdiction approved modification.

It is an object of the invention that an inspection report generator compiles all of the disapproval notes into a preconfigured report that includes inspection type(s), approvals, disapprovals, deficiency details, code references, explanations, contact, follow-up instructions and other pertinent information and directions.

It is an object of the invention that the check-off list has a catchall check-off for each sub-contractor check-off approval that allows him to use that category. If this is abused the department has the option to deactivate this feature.

Designer and Associated Interfaces

It is an object of the invention to specify codes and generally filter code requirements through pull down fields that filter general categories of code requirements to manageable sets of requirements.

It is an object of the invention to provide a utility to the building designer to filter code requirements to those that are relevant to each construction project by sifting through general categories of desired building design features.

It is an object of the invention to provide an editor to further exclude irrelevant code requirements and add others that may be relevant using a manual code requirement filter determined by the specific code being reviewed.

It is an object of the invention to include a building schematic development utility for the designer that mirrors the building floor plans as a means to direct the inspector's inspections and to organize requirement compliance to specific relevant areas.

It is an object of the invention to provide access to database of listed construction materials and building science reports.

It is an object of the invention to provide access to subscribed building codes state and local ordinances, and zoning.

It is an object of the invention to provide links to other agencies that may have relevance in design and permitting of buildings.

It is an object of the invention to give the designer the ability to define who is responsible for insuring project quality control and calling for inspections.

It is an object of the invention to give the designer the ability to define who will be responsible on design team for oversight of International Building Code (IBC)/International Residential Code (IRC) Chapter 17 special inspection requirements.

It is an object of the invention to provide a mash-up of green compliant specifier databases for Leadership in Energy and Environmental Design (LEED) and Green Globes compliant projects.

It is an object of the invention to include a user-interface that uses an interview process to simplify the process of qualifying and complying with complex regulations.

It is an object of the invention to maximize the use of pull-down fields that are sequential to one another and drill-down on large volumes of information with a minimum of list reviews and mouse clicks.

It is an object of the invention to not limit the use of pull-down fields to accessing databases; the system also searches plan details, code and ordinance requirements, policies, and interpretations.

It is an object of the invention to provide a database of building product suppliers are accessed through system via subscription or other arrangements.

It is an object of the invention to allow primary, secondary, and tertiary choices of specific products are listed in accessible databases with third-party Listing documentation. When changes are made, an automatic notification occurs via Internet to the jurisdiction project specification file, which may incur additional fees per jurisdiction policies.

It is an object of the invention to provide access to databases such that this will greatly simplify the design specification and design modification process and may be provided through paid subscriptions and interfaces with private vendors.

It is an object of the invention to include policies on questionable products that have not demonstrated acceptable compliance criteria may be included in an accessible database.

It is an object of the invention to use pay-per-project Internet site accounts to submit project documentation and required information.

It is an object of the invention to require that all submittals manage the data input in a consistent and comprehensive process that still accommodates design license on the part of the design professional.

It is an object of the invention to allow state-of-art computer-aided design (CAD) system technology to be utilized to interface with the submittal process while still allowing for traditional conventional paper submittals.

It is an object of the invention to provide a direct connection with the inspector and jurisdiction through the use of PDA's, computers, GPS, the Internet, Jurisdiction Intranets, and web site user accounts.

It is an object of the invention to "Mash-up" (per WEB 2.0™ or better alternatives) different materials and specifier databases for a project.

It is an object of the invention to incorporate a family of Internet sites where micro-content is used to provide useful information to the designer relating to design specifications and on the fly, re-specifications of project details that often happen as a result of lack of product availability or other design considerations.

It is an object of the invention to allow the upload of specified CAD drawing files or building plan schematics that will be reviewed by the jurisdiction plan reviewer and form the basis for the contractor pre-inspection check off interface and the inspector's inspection checklist interface.

It is an object of the invention to allow those that submit plans in a conventional format to convert the plan into a format interoperable with the system file upload criteria.

It is an object of the invention to provide a utility that generates scaled versions of the building plans as they are implemented into the inspection/compliance software.

It is an object of the invention to utilize but not be limited to plan elevations, floor, roof, foundation, site section views as examples of plan details needed for this process.

It is an object of the invention that the building plan files be converted into segmented hyperlinks by the actions of the designer, the software interface and subject to the approval of the jurisdiction plan reviewer.

It is an object of the invention that these segmented hyperlinks combine to represent the actual graphic building project plans.

It is an object of the invention that the user ultimately is able to click on the hyperlink segments to reveal the specific project detail requirements for each visually depicted segment, which comes in the form of a check off list for the contractor or inspection checklist for the inspector.

It is an object of the invention that the inspector and contractor then use the PDA or other equivalent printed form of checklist mechanism that allows them to move around the building to systematically check requirements.

It is an object of the invention that the hyperlinked segments each be configured to select requirements by individual codes or requirement sets or to combine different codes or requirement sets.

It is an object of the invention that the designer/contractor's permit package provides project- and trade-specific, easy-to-read printout building graphics and directions to designers, contractors and subcontractors. Graphics- and text-based specifications provide critical detail for problematic construction components that are often inadequately addressed such as but not limited to insulation, vapor barriers, ductwork, air sealing, nailing, connectors, weather sealing, roofing, and building materials.

It is an object of the invention that compliance checklist sheets have check-off boxes that the sub-contractors would use to affirm compliance and supply to the contractor, making his or her job easier and helping to ensure a passing inspection by the jurisdiction.

It is an object of the invention that the general contractor would use the results to check approval or disapproval boxes on the pre-inspection check off lists using his or her PDA interface or check off list paper form as a prerequisite to the jurisdiction inspection.

It is an object of the invention that, in addition to English, the aforementioned specification sheets/worker directions are translated into languages that represent those of the prevailing workforces, current examples of which include but are not limited to Spanish and Russian. This allows contractors to hire and maximizing the productivity of non-English speaking sub-contractors by communication of specific requirements for each job while minimizing the language barrier.

It is an object of the invention that the level of compliance requirement detail be adjustable by the system administrator to reflect policy of the department or mandates from the authority having jurisdiction. An audit control will assign a tracking mechanism for the level of detail that was selected for all design submittal data, making the authority having jurisdiction accountable for the level of detail that is selected. If the political climate for this feature is a market impediment and is not required by the authority having jurisdiction, it can be incapacitated but the system will record design submittals performed under these conditions. This adjustability feature accommodates political and program mandates that may vary by jurisdiction and/or that evolve over time as the enforcement climate changes.

Plan Review and Associated Interfaces

It is an object of the invention to facilitate access to subscribed building codes, state and local ordinances, zoning, and other regulations as they apply.

It is an object of the invention to provide links to other agencies that may have relevance in design and permitting of buildings.

It is an object of the invention to review who is responsible for insuring project quality control and calling for inspections.

It is an object of the invention to review who will be responsible on a design team for IBC/IRC Chapter 17 special inspection requirements.

It is an object of the invention to include a module for IBC Chapter 17 reports and protocols for lateral, concrete and other designated special inspection requirements. The functionality of the system accommodates this accessory process.

It is an object of the invention to "Mash-up" (per WEB 2.0™ or better alternatives) different materials and specifier databases for a project.

It is an object of the invention to include compatibility and interoperability with LEED, other energy software applications and other appropriate applications.

It is an object of the invention to specify standard jurisdiction inspection protocols.

It is an object of the invention to specify all special inspection protocols, timing, coverage, and inspector/inspection agency credentials.

It is an object of the invention to review hyperlinked building plan schematics developed by the designer.

It is an object of the invention that a mash-up of green compliant specifier databases for LEED, Green building plan reviews Include a user-interface that incorporates an interview process to simplify the process of qualifying and complying with complex regulations.

It is an object of the invention that plan review occurs through the use of two interfaces (1) an interview protocol and/or (2) a checklist directory of all items that need to be plan reviewed. Each of these options may be used interactively with one another. Complex code requirements may be reviewed in the interview mode through a series of it incremental questions that simplify the application of key code requirements. Many of the requirements may be automatically checked against those submitted in the designer-supplied plan and specification submittal files. Problem or questioned areas of the submittal are automatically flagged by the software for review.

It is an object of the invention that the plan review accesses an electronic submittal software package that is submitted by the project design team.

It is an object of the invention that depending on the level of sophistication and implementation of the system, hardcopy plans and specifications may or may not be required.

It is an object of the invention to maximize the use of pull-down fields that are sequential to one another and drill-down on large volumes of information with a minimum of list scrolling and mouse clicks.

It is an object of the invention that aforementioned pull-down fields be used but are not limited to accessing databases, searches, plan details, code and ordinance requirements, policies and interpretations.

It is an object of the invention that building product supplier databases and accessory documents are accessed through system via subscription or other arrangements.

It is an object of the invention that primary, secondary, and tertiary choices of specific products are listed in accessible databases with third-party Listing documentation. When changes are made to previously approved design features, an automatic notification occurs via Internet to the jurisdiction project specification file, which may incur additional fees per jurisdiction plan review policies. These changes are flagged to jurisdiction staff.

It is an object of the invention that access to all databases pertinent to the majority of building construction greatly simplifies the design specification and design modification process and may be provided through paid subscriptions and interfaces with private vendors.

It is an object of the invention that policies on questionable products that have not demonstrated acceptable compliance criteria may be included in an accessible database.

It is an object of the invention to provide a direct connection with the inspector and jurisdiction through the use of PDA's, computers GPS, the Internet, Jurisdiction Intranets, and web site user accounts.

It is an object of the invention to allow access to a family of sites where micro-content is used to provide useful information to the designer relating design specifications and on the fly re-specification of project details that often happens as a result of a lack of product availability and other design considerations.

It is an object of the invention to facilitate LEED, Green Globes and other green building program compliant projects.

It is an object of the invention that the program interface allow access to submitted CAD drawing files for each project that will be reviewed by the jurisdiction plan reviewer and form the basis for building project permit approvals and electronic files that will be transmitted to the design/construction team, the jurisdiction project files And the building inspectors. Examples of these electronic files include the contractor pre-inspection check off interface and the inspector's inspection checklist interface.

It is an object of the invention that those that submit plans in a conventional format will need to convert the plan into a format interoperable with the system file upload criteria, to the extent that paper-based documentation and code compliance verification mechanisms are distributed to the stakeholders.

It is an object of the invention that these files provide scaled version of the building plans as they are implemented into the inspection/compliance software.

It is an object of the invention that plan elevations, floor, roof, foundation, site section views be examples of plan details needed for this process.

It is an object of the invention that segmented hyperlinks developed by the designer combine to represent the actual graphic building project plans.

It is an object of the invention that the designer develop the hyperlink segments to reveal the specific project detail requirements for that visually depicted segment, which comes in the form of a check off list for the contractor or inspection checklist for the inspector.

It is an object of the invention that the PDA and/or field computing equipment have a direct connect or wireless capability to revise or download files critical to project-specific, field inspections including communications, directions, checklists, compliance verification and other field tasks. This capability must allow file synchronize, move and utilize files and applications on the fly.

It is an object of the invention that the level of plan review detail be adjustable by the system administrator to reflect policy of the department or mandates from the authority having jurisdiction. An audit control will assign a tracking mechanism for the level of detail that was selected for all plan reviews, making the authority having jurisdiction accountable for the level of detail that is selected. If the political climate for this feature is a market impediment and is not required by the authority having jurisdiction, it can be incapacitated but the system will record plan reviews performed under these conditions. This adjustability feature accommodates political and program mandates that may vary by jurisdiction and/or that evolve over time as the enforcement climate changes.

In accordance with the present invention, there is provided a system, called COMPATH™, incorporating computer technology, hand-held computers, Intranets, the Internet, hard-copy forms and instructions, and other technology to expedite and improve in-field compliance in buildings with building codes, ordinances and other regulations, logistics and communications. Notable code provisions that will be better enforced are energy, seismic, wind and virtually any regulations that are enforced be incorporated into the system. It addresses an unsolved need by building code jurisdictions and other regulation enforcement agencies to systematically enforce, at a high level, the aforementioned regulations and to consistently and effectively communicate requirements and inspection results with design/construction stakeholders.

This system readily condenses and renders useful the increasing number and complexity of these regulations so that they can be applied to actual buildings. Enforcement agencies continue to lag in their ability to enforce them and this system provides a tool to make virtually every element of the inspection process more efficient through better organization and better verification of what are often very technical requirements. The impacts of this lack of capability have been manifested in damage from catastrophic storms, earthquakes, and poor energy efficiency, in many instances where code compliance was not robust. Hurricanes Katrina, Andrew and Rita, and Northridge and Loma Pieta earthquakes in California have alone cost billions in avoidable damage—attributable by forensics engineers to lax code enforcement.

BRIEF DESCRIPTION OF THE DRAWINGS

A complete understanding of the present invention may be obtained by reference to the accompanying drawings, when considered in conjunction with the subsequent, detailed description, in which:

FIG. 8 is a computer screen shot view of a plan review checklist utility. This utility acts as a plan review editor where the jurisdiction plan reviewer can add or subtract pre-filtered requirements that either apply or not to individual projects.

FIG. 10 is a screen shot view of a contractor pre-inspection verifier. This checklist is customized for each inspection location for a specific building and also provides a list of those requirements that are typical to all areas. The contractor must confirm that all requirements are met on this collective checklist prior to requesting a formal jurisdiction inspection.

FIG. 16 is a screen shot view of a handheld computing system inspection route organizer and inspection screen.

FIG. 17 is a screen shot view of an inspector inspection verifier. This checklist is customized for each location and also provides a list of those requirements that are typical to all areas. The building inspector must confirm that all requirements are met on this collective checklist prior to issuing approvals for inspections.

FIG. 18 is a screen shot view of an inspection drill-down verifier. This is an example of a screen that is activated when the "detailed check off" hyperlinks for each requirement are employed in the inspector inspection verifier screens. They allow a more detailed description and approval format for those that need more direction. They also provide an approval, disapproval and notation radio buttons. for those that need more detailed explanations of inspection requirements, the "details" hyperlinks can be invoked for an even more detailed illustration of the systems being inspected.

FIG. 19 is a screen shot view of a duct drill-down verifier. This screen is an example of an even more detailed treatment of building system details, the regulation requirements and the approval, disapproval and notation radio buttons. It provides links to approved materials for compliance; the importance of the measures; critical areas of attention; commentaries that provide background information and technical documentation; code references to the requirements and a feedback mechanism for the software developers.

FIG. 22 is a screen shot view of a jurisdiction inspector's glazing inspection screen example.

FIG. 23 is another screen shot view of the jurisdiction inspector's glazing inspection screen from FIG. 22. This screen is repeated to show additional details and features of FIG. 22.

FIG. 24 is another screen shot view of a jurisdiction inspector's glazing inspection screen from FIG. 22. This screen is repeated to show additional details and features of FIG. 22.

FIG. 25 is another screen shot view of a jurisdiction inspector's glazing inspection screen from FIG. 22. This screen is repeated to show additional details and features of FIG. 22.

FIG. 26 is another screen shot view of the jurisdiction inspector's glazing inspection screen from FIG. 22. This screen is repeated to show additional details and features of FIG. 22.

FIG. 28 is a screen shot view of a typical inspection report COMPATH™ system.

FIG. 29 is a screen shot view of an example of a subcontractor pre-inspection checklist.

FIG. 30 is a screen shot view of an example of an other-than-English subcontractor pre-inspection checklist.

For purposes of clarity and brevity, like elements and components will bear the same designations and numbering throughout the Figures.

DETAILED DESCRIPTION

Figure 1:
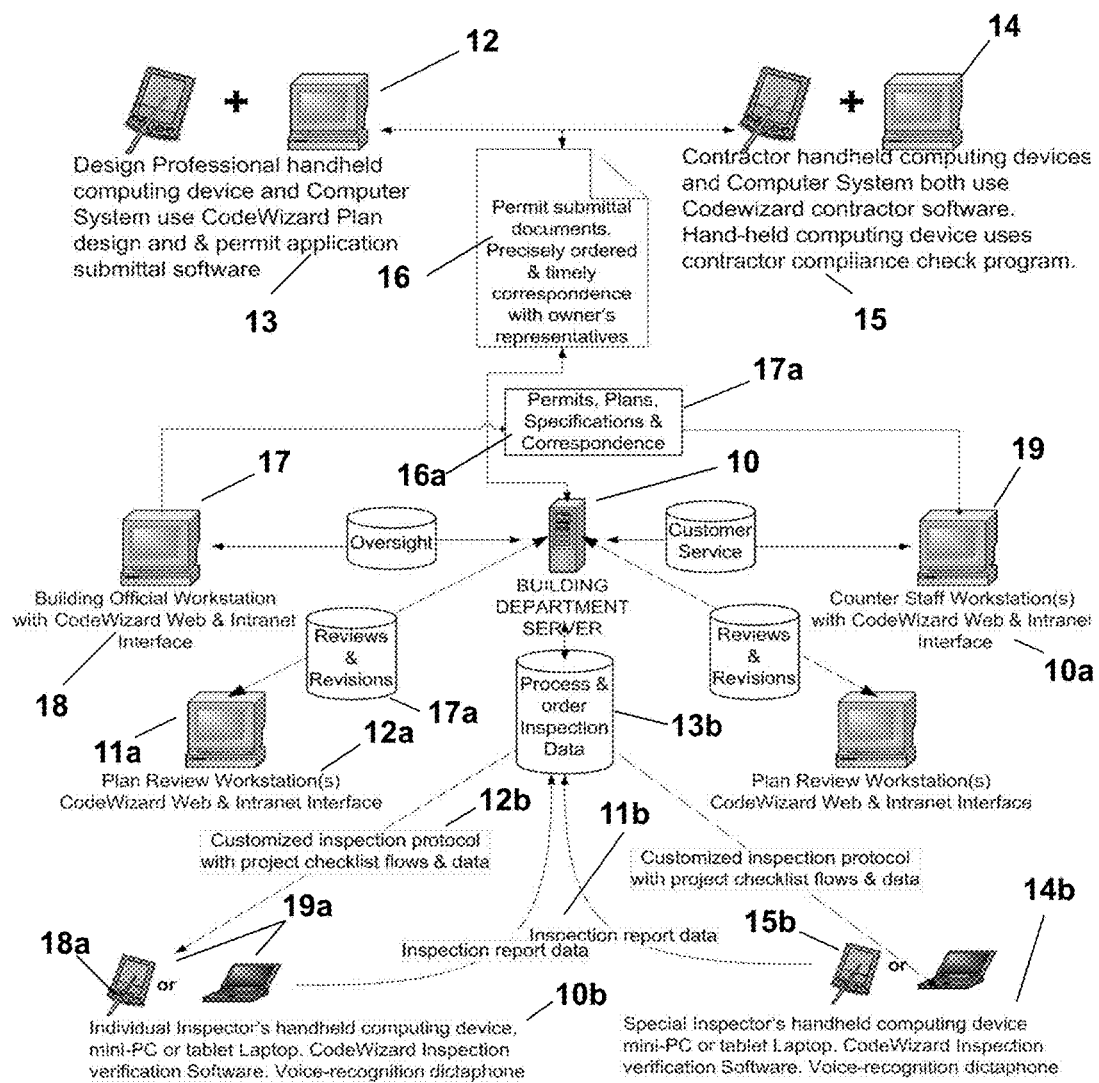
FIG. 1 is a flow diagram view of an overall COMPATH™ system flow chart, depicting the ways in which users interact with the system.

FIG. 1 is an overview to overall COMPATH™ system function, depicting the general ways in which users interact with each other and the system. The design professional application 12 is the program interface that resides in the computing systems and accessible web sites that are part of the system.

COMPATH™ System Network Server

The building department server 10 established and maintained by the jurisdiction, serves as the central hub for the COMPATH™ system and provides the core functionality that ties the entire network together. The COMPATH™ system is not always intended to replace but rather to improve and meld with the existing jurisdiction web sites and networks. The system blueprint recognizes that some of the components of the COMPATH™ system may already be included in the jurisdiction web sites in which case the duplicating COMPATH™ system features can be disabled as needed.

Web Site and Software Components

Computing device software and/or web site access provides the functionality of the COMPATH™ system interfaces that are accessed by the contractor application 15, owner/builders through the contractor application 15 an interface of which is on the web, design professional application 12, field inspector application 10b, building official application 18, plan review application 12a, and counter staff application 10a. Each interface recognizes and responds to the specific interactions that are required of users in the design/construction and code enforcement process as depicted in this section. Data for all of the interfaces are stored on the building department server 10 and are downloaded and uploaded, as needed by users. Users have the ability to personalize the order of listed utilities in system screens only where it does not degrade the function and effectiveness of the system.

Field Inspector's COMPATH™ System Components

Inspectors will carry an inspector's hand-held computing device 18a into the field capable of handling COMPATH™ system functions depicted elsewhere in this description. The COMPATH™ system will take advantage of rapid improvements in handheld technology and web/software advances to constantly improve system function.

These COMPATH™ systems may include but are not limited to:
Small touch-screen, hand-held computers
Tablet computers
Personal Desk Assistants (PDA's)
Blackberry, IPhone- and Treo-style PDA mobile phones
Windows-based handheld computing devices
"Ruggedized" handheld devices These portable computing devices are most efficient with Wi-Fi capability 19a so that they can transmit and receive data to and from the building department server 10 during the day to and from system users. Alternative methods include Bluetooth data transfer with the building department server 10 that in-turn have Wi-Fi capability 19a or cell phones acting as a modem.

Inspectors may also carry portable printers, inspector's hand-held computing device 18a, cell phones and other equipment that help realize the full capacity of the COMPATH™ system. Functions such as portable printing on site are at the discretion of the jurisdiction but the inspector may also employ e-mail or faxes for the same purposes.

The inspector's hand-held computing device 18a is loaded with COMPATH™ system field inspector application 10b software that is downloaded and periodically updated from the jurisdiction server.

The COMPATH™ system-compatible, hand-held computing device and field inspector application 10b software includes links through the building department server 10 to the following components:
Project inspection checklists
Inspection approval/disapproval screens
Inspection reports edit and transmit screens
Project building plan schematics 59 Database of issued permits
Database of projects inspected by inspector
Inspection request interface
Inspection route organizer
Inspection route maps and route finder
Inspection records including personal notes
Scheduled Inspections 158
Communications records relating to projects
Jurisdiction ordinances
E-mail and fax access with dept. stationary
State code amendments
State Building codes
Communications interface with the jurisdiction
Client contact information
Building codes, interpretations, commentaries, standards, listings, and technical documents
Product databases and listings The COMPATH™ system provides an inspection data download 11b of an approved inspection file for performing each inspection. This file includes all of the pertinent information for the permitted project.

Using the inspection data download 11b, which includes all checklists and permit information 153, the inspector completes his/her scheduled field Inspections 41 following a route and schedule laid out by the COMPATH™ system.

Contractor's COMPATH™ System Components

Although contractors are not required to have all of the components of the COMPATH™ system, employing the following COMPATH™ system components will simplify code compliance, and communications, and generally make the overall regulatory process more cost-effective and trouble-free. The contractor will have access to the jurisdiction COMPATH™ system on the building department server 10 and functions that are specifically intended for contractors such as:

Jurisdiction policies, procedures and ordinances
Special bulletins including identification of problem areas in compliance
Tips for working efficiently with the jurisdiction
State codes and code amendments
Links to subscribing to or purchasing codes, standards, commentaries and other technical references
Permitted inspection records Content for these site features may be provided by both COMPATH™ and the jurisdictions.

Contractors should have a hand-held, COMPATH™ system-compatible, contractor computing device 14 that is field capable of handling COMPATH™ contractor application 15 system functions depicted elsewhere herein. These COMPATH™ systems may include but are not limited to:

Small touch-screen hand-held computers
Tablet computers
Personal Desk Assistants (PDA's)
Blackberry-, IPhone- and Treo-style PDA mobile phones
Windows-based handheld computing devices
"Ruggedized" handheld devices These portable computing devices are most efficient with Wi-Fi capability 19a or another means of connection with the Internet so that they can transmit and receive data to and from the building department server 10 during the day. Alternative methods may include Bluetooth data transfer with other computers that in-turn have Wi-Fi capability 19a or cell phones acting as a modem.

The design professional application 12 is compatible with the design professional computing device 11, which is comprised of a laptop or desktop computer. The design professional protocol allows the designer to provide project specific input to the COMPATH™ system. This input is comprised of a proposed list of code compliance regulations, building layout schematics and other project information. The design professional application 12 also provides a framework for sending and receiving communications. This will be further discussed herein in greater detail.

The building official application 18 is compatible with the building official computing device 17, which is typically comprised of a laptop or desktop computer. The building official role is one of providing oversight, input, and observation to the overall building code 77 enforcement processes. This will be further discussed herein in greater detail.

The counters staff, application is compatible with the counters staff computing device, which is typically comprised of a desktop computer. Counter staff uses the jurisdiction counter staff application 10a to schedule Inspections 41, communicate with building jurisdiction staff (inspectors in plan reviewers) designers and contractors. The counter staff application 10a provides real-time access to the status of building Inspections 41, inspection times, inspection results, and other communications intended for users of the system.

The jurisdiction plan review application 12a is compatible with the plan review workstation 11a, which is typically comprised of a desktop computer. Plan review process is one of reviewing COMPATH™ system inputs from the design professional. These inputs include building layout schematics, draft building code 77 compliance checklists, and other relevant project and building permit information 153. This will be further discussed herein in greater detail.

The special inspector application 14b and special plan review application 12a are compatible with the special inspector computing device, which is typically one of the following:

Small touch-screen hand-held computers
Tablet computers
Personal Desk Assistants (PDA's)
Blackberry-, IPhone- and Treo-style PDA mobile phones
Windows-based handheld computing devices
"Ruggedized" handheld devices
Desktop computer The special inspection application is limited to the capabilities that allow it to perform field Inspections 41. For this purpose, the functionality is the same as the field inspector application 10b. This will be further discussed herein in greater detail.

The special plan review application 12a is identical in function to the plan review application 12a. This will be further discussed herein in greater detail.

Figure 2:
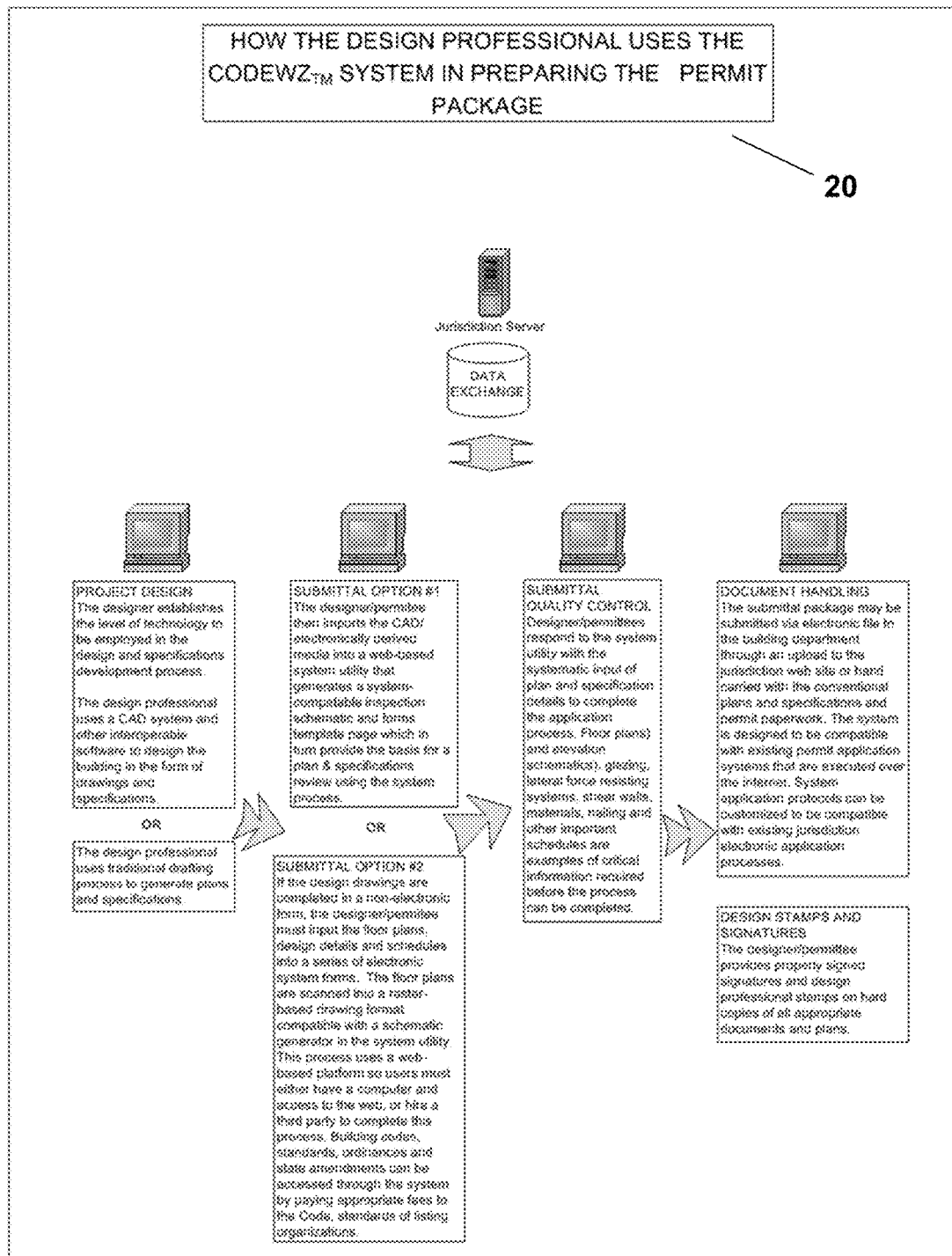
FIG. 2 is a flow diagram view of a design professional and how he/she uses the COMPATH™ system in projects.

FIG. 2 is a flow diagram view of the design professional application 12 and how he/she uses the COMPATH™ system in projects. An explanation of the design professional application 12 resides in this figure.

Figure 3:
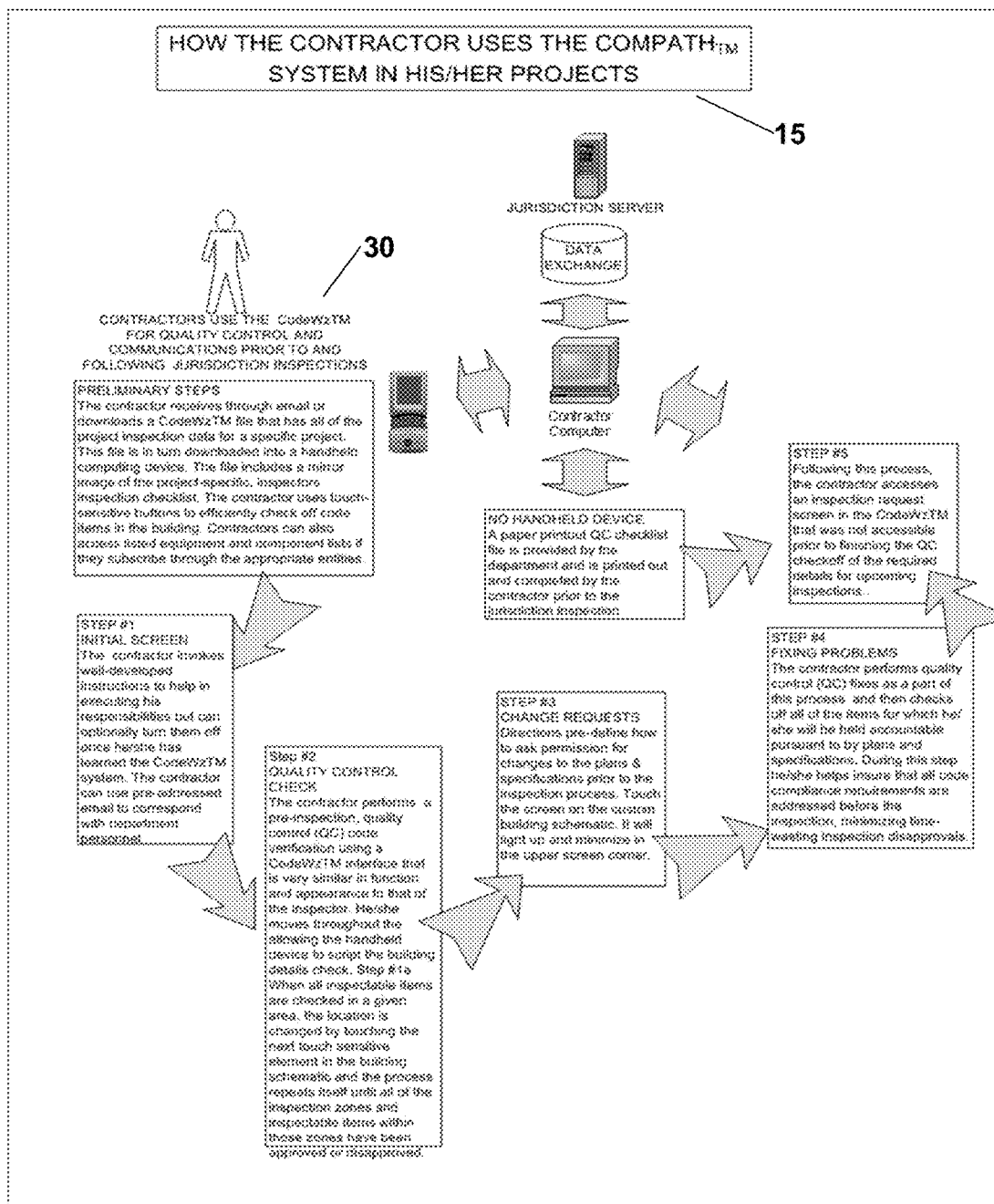
FIG. 3 is a flow diagram view of a contractor and how he/she uses the COMPATH™ system in projects.

FIG. 3 is a flow diagram view of the contractor application 15 and how he/she uses the COMPATH™ system in projects. An explanation of the contractor application 15 resides in this figure.

Figure 4:
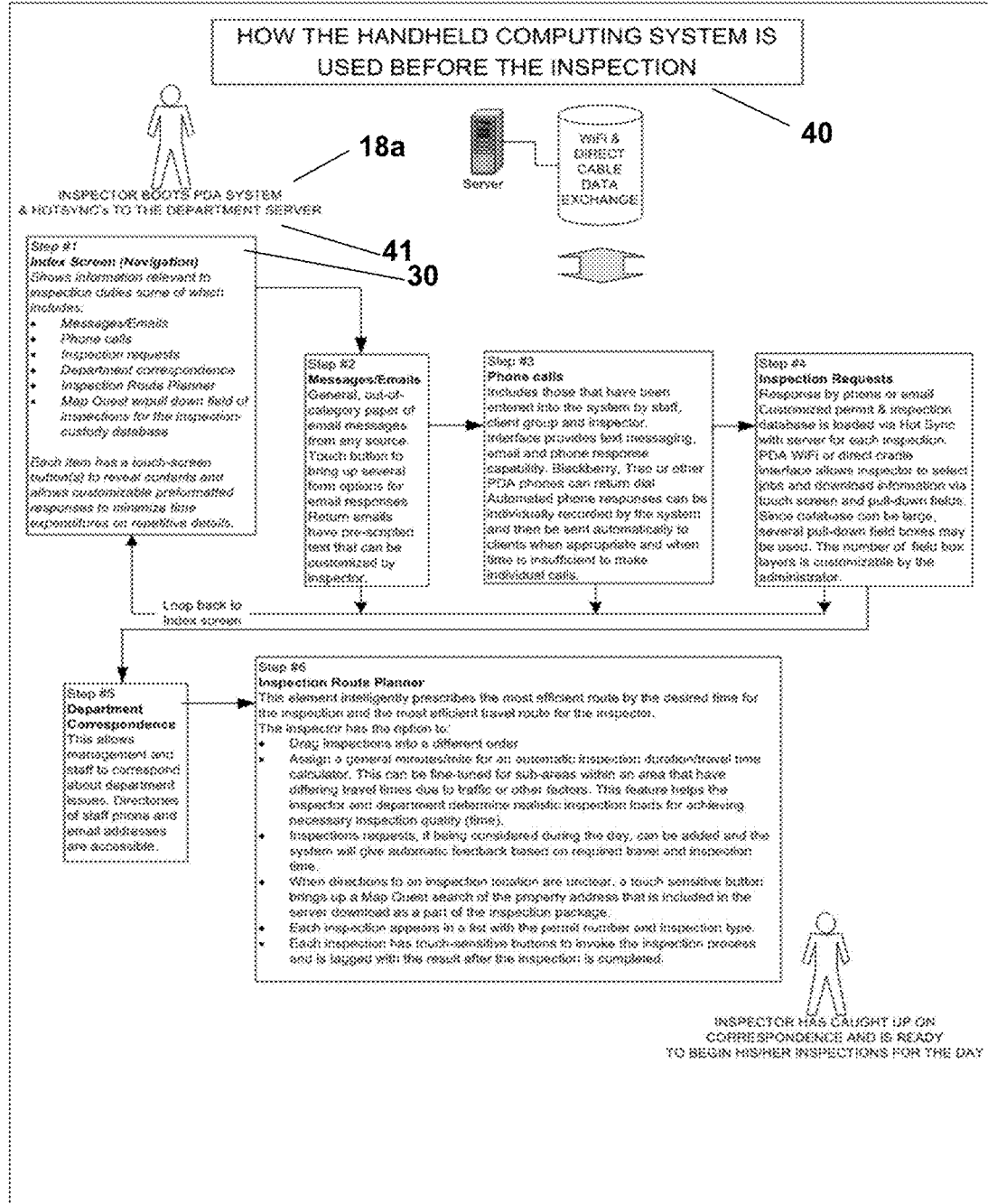
FIG. 4 is a flow diagram view of a descriptive flow chart showing how the building inspector uses a hand-held computing device with loaded the COMPATH™ system prior to inspections to organize his day and communicate with project stakeholders.

FIG. 4 is a flow diagram view of field inspector application 10b and how he/she uses an inspector's hand-held computing device 18a with loaded COMPATH™ system prior to Inspections 41 to organize his day and communicate with project stakeholders. An explanation of the field inspector application 10b resides in this figure.

Figure 5:
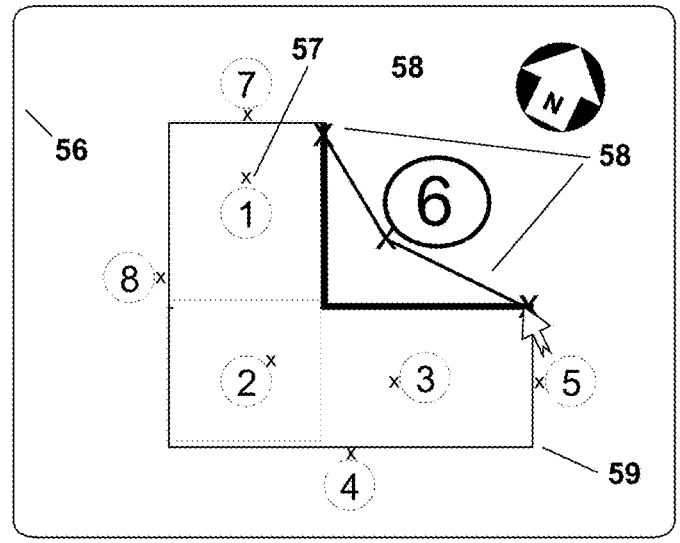
FIG. 5 is a computer screen shot view of an inspection layout planner for individual building designs. It includes a utility that develops the building plan schematics for each floor in the design. It also lets the designer establish inspection locations limited to the viewable area to verify inspection requirements that pertain for those locations.

FIG. 5 is a computer screen shot view of the building designer utility 50. It is an inspection layout planner for individual building designs, and includes a utility that develops the building plan schematics 59 for each floor 310a in the design. It also lets the designer establish inspection locations limited to the viewable area to verify inspection requirements that pertain to those locations. It shows permit ID information 52, so the user knows which project is loaded. The drag-and-drop building format FIG. 53 can be pulled down into the floor plan locator 56 in the configuration of the building design. The floor level 55 can be adjusted with the pull-down field. Inspection locations, where the inspector stands to observe building elements within his view for the purpose of determining building code 77 conformance, are laid out with the automatic inspection location designator 57. When the first inspection location is determined, a double-click on the initial location populates, in sequence, the rest of the suggested locations. This comprises the automatic inspection location designator 57. The designer can drag any of the location numbers 165a to any point of the drawing with the inspection location editor 58. Back and continue buttons 177 at the bottom of the screen allow access to the previous screen or to continue on to the next step in defining all inspection locations and building floor 310a plan configurations in the floor plan locator 56.

Figure 6:
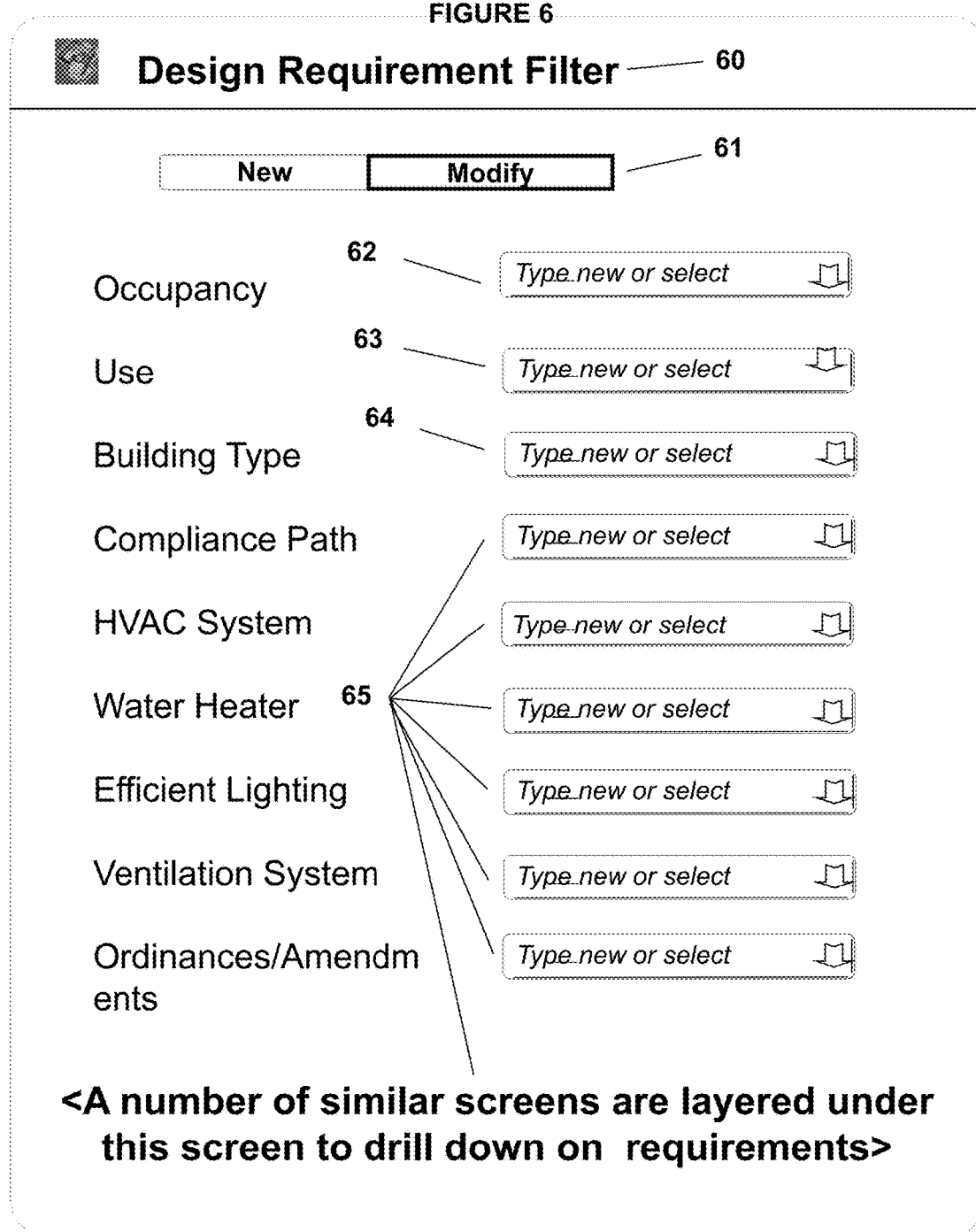
FIG. 6 is a computer screen shot view of a design requirement filter. This filter drills down on groups of requirements that pertain to a particular design and eliminate those that do not apply.

FIG. 6 is a computer screen shot view of a design requirement filter 60. This filter selects requirements and regulations that pertain to a particular design and eliminates those that do not apply. The new construction or remodel selection button 61 allows the user to select only those requirements that apply to new construction or a remodeling project. Once the selection has been made, each of the subsequent fields can be invoked to target the actual requirements that will pertain to the project. Occupancies defined by the regulations being enforced 62 are broad categories of buildings that pertain to their functions and risk factors. Examples of different occupancies would be hazardous, assembly and residential. A second level of filtering involves a specific Use defined by the regulations being enforced 63 that fall within these occupancies. Examples would be single-family dwellings, restaurants in the chemical plant. Further filters would include building type defined by the regulations being enforced 64. This simply refers to varying combinations of building materials. The remaining filters represent examples of other collective system selections that eliminate regulations not pertinent to the project 65. Many other collective system selections that eliminate regulations not pertinent to the project 65 would be used where, as a general rule, they can be included to eliminate requirements that are not pertinent to the project design.

Figure 7:
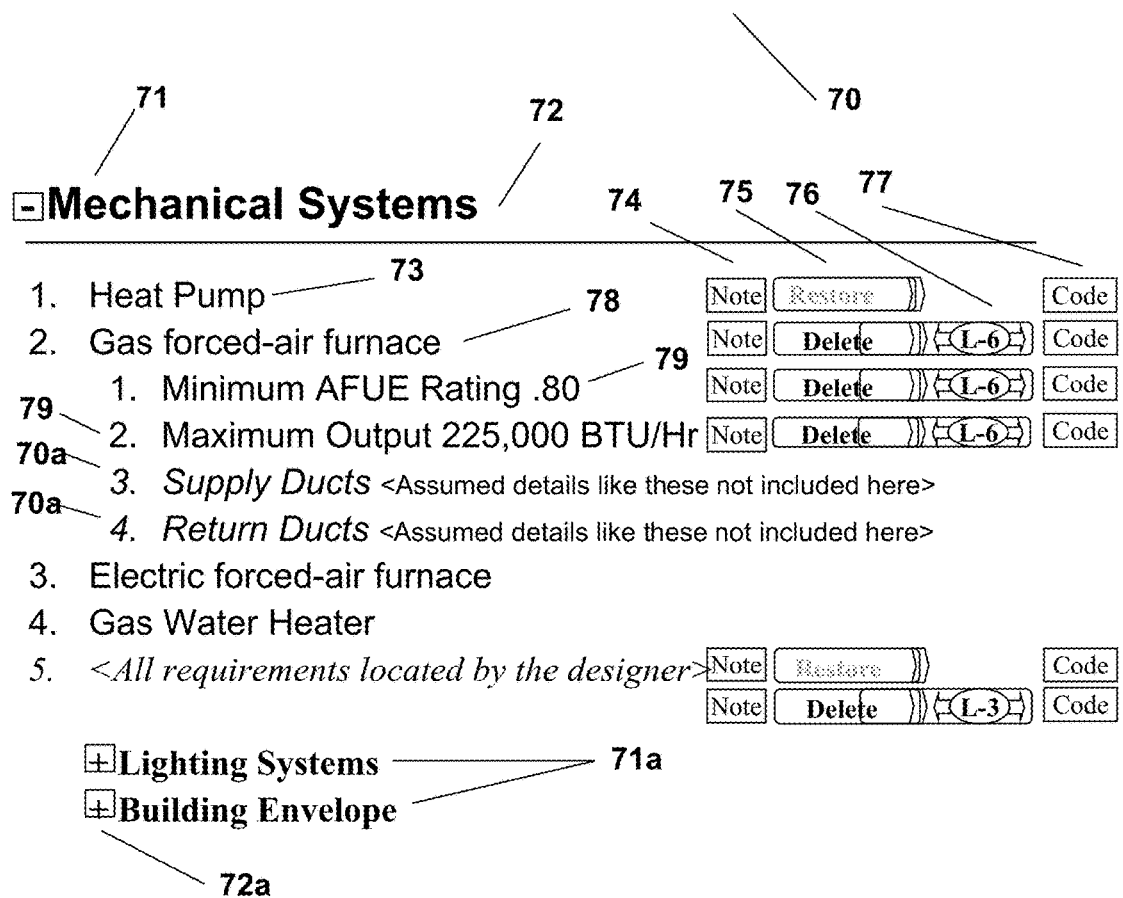
FIG. 7 is a computer screen shot view of a designer checklist selector utility. This utility acts as a screening editor where the designer can add or subtract requirements that either apply or not to individual projects.

FIG. 7 is a computer screen shot view of the design professional checklist editor 70. This utility acts as a final screening editor where the designer can add or subtract requirements that either apply or not to individual projects. This represents the output of the design requirement filter 60 and gives the designer the ability to locate requirements where systems reside. In the case of our example, mechanical systems 72 represent a category of requirements that includes a heat pump 73, and a gas forced-air furnace 78. In this case, our example building has a gas forced-air furnace 78 and does not have a heat pump 73. The delete/add buttons 75 are used to reflect these selections in the design. Note that heat pump 73, when not selected, is grayed out. This is an extraneous requirement that is not needed. This remains in the list so that the plan review checklist will reflect this modification. The gas forced-air furnace 78, on the other hand, has been selected and is not grayed out. Note that a location of the requirement 76 button has appeared once the requirement is selected. It is incumbent on the designer to locate the system, in this case, a gas forced-air furnace 78, in the correct location for inspection. The location of the requirement 76 buttons can be toggled with the red arrows to select the proper location. In addition to the gas forced air furnace listing, associated requirements 79 that pertain to the efficiencies of that system are listed as a subset. In some cases, the designer may wish to provide comments to the plan reviewer, that are directly associated with individual requirements 107. In that case, the note button 74 would be depressed, allowing a note to be added, that will be transmitted to the plan review application 12a. In this example, other minimized systems 71a are included, including a lighting system and a building envelope system. In both cases, they can both be expanded by clicking on the "+" sign 72a in the box or by clicking it again to make the "−" sign 71 to expand to expose the underlying requirements. The building code 77 button, when depressed, shows the underlying code provision for that particular checklist requirement.

FIG. 8 is a computer screen shot view of the plan review checklist editor 80. This utility allows jurisdiction plan reviewers to add or subtract specific building regulation requirements that have been submitted by the building designer for the building project. This represents the output of the design requirement filter 60 and design professional checklist editor 70, which are used by the designer to develop checklists for review by the jurisdiction plan reviewer. The screen very closely mirrors the design professional checklist editor 70. The example requirements are the same, as they would be in an actual plan review situation. In the case of our example, mechanical systems 72 represent a category of requirements that includes a heat pump 73, and a gas forced-air furnace 78. In this case, our example building has a gas forced-air furnace 78 and does not have a heat pump 73. The delete/add buttons 75 are used to reflect these selections in the design. Note that heat pump 73, when not selected, is grayed out. This is an extraneous requirement that is not needed. The plan reviewer will verify that these entries are correct and leave them as is. Note that a location of the requirement 76 button is included free notes that will be returned to the designer. The plan reviewer will verify the location of the system, in this case, a gas forced-air furnace 78, in the correct location for inspection. Again, the location of the requirement 76 buttons can be toggled with the red arrows to select the proper location. In addition to the gas forced air furnace listing, associated requirements 79 that pertain to the efficiencies of that system are listed as a subset. In some cases, the plan reviewer may wish to provide comments to the designer that are directly associated with individual requirements 107. In that case, the note button 74 would be depressed, and a note can then be added, that will be transmitted to the designer application. As in the design professional checklist editor 70, other minimized systems 71a are included, including a lighting system and a building envelope system. In both cases, they can both be expanded by clicking on the "+" sign 72a in the box or by clicking it again to make the "−" sign 71 appear. The building code 77 button, when depressed, shows the underlying code provision for that particular checklist requirement.

Figure 9:
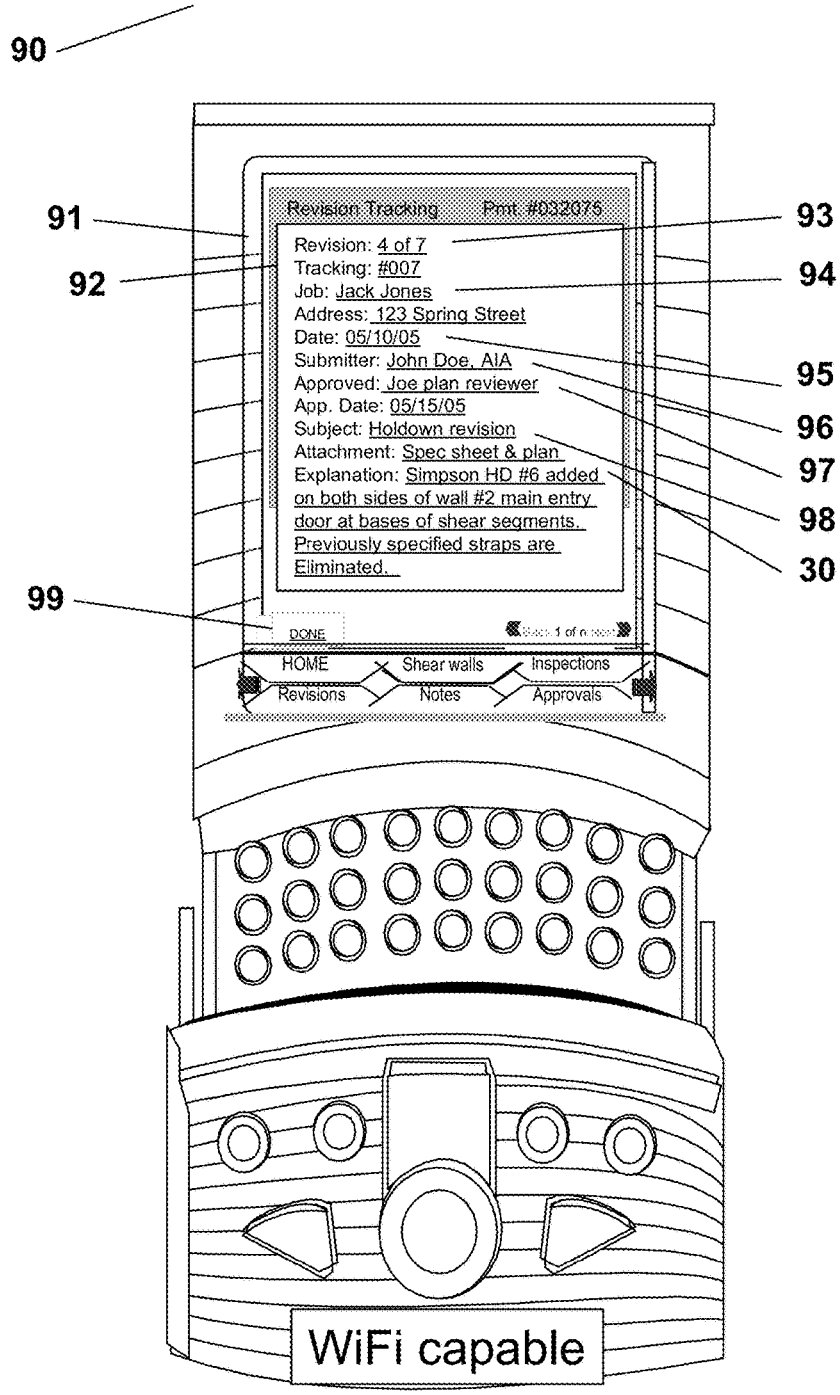
FIG. 9 is a screen shot view of a handheld computing system utility used to file, edit, and view plan and specifications revisions.

FIG. 9 is a screen shot view of a handheld filed revisions utility 90, which is used to file, edit and view plan and specification revisions. Revisions are typically submitted after the project is underway. For this purpose, the filed revisions utility 90 was developed to allow the submitter 96, contractors, and designers, to submit project revisions 91. These project revisions 91 must meet specified code requirements 99, as did the original project revisions 91. The file revisions utility includes the number of the revision 93, which refers to the number of specific changes to a particular requirement and other key identification of the permittee and job 94. It also includes the date 95 and the subject of revision. Project revisions 91 must be approved by the building code 77 jurisdiction, and then are redistributed to the contractor application 15. The subject of the revision 98 details the technical change to be used in the project. This becomes a part of the contractor checklist and field inspector checklist 160. It also can include an explanation of the change. Any change in this utility is reflected throughout the system and it is observable by all stakeholders in this project. The tracking number 92 provides an overall count on the revisions for the project.

FIG. 10 is a screen shot view of a contractor pre-inspection assistant 100. This screen provides a checklist that is customized for each location of the inspection 101 in a building and also provides a list of requirements that are typical to all areas. All of the requirements in a building are collectively reviewed during this process to provide a very precise and accountable verification of compliance with all building codes that apply 103. The screen includes permit and job identification 102 to always provide a point of reference for the screen. The location of the inspection 101 or the job address is also included. It specifies the building codes that are in play in an inspection. It also specifies the floor level 55 where the inspection is being performed in the floor level indicator 108. The building schematic 105 has a series of hyperlinks that can each be invoked by clicking on specific areas of schematic. Requirements by location 104 are illustrated as a result. Typical requirements 110 are requirements that are typical of all areas, not just a specific location. The detailed check off hyperlink provides access to more detailed explanations of each of the requirements by location 104 and technical requirements. This provides real-time education about the application and background information for each of the requirements, providing a unique context driven educational benefit. After the contractor has verified and checked off all of the requirements by location 104 and typical requirements 110 as being met, the call for framing inspection 112 button becomes illuminated and live. Prior to these verifications, this button is grayed out and cannot be invoked. This button provides a link to the building department and communicates the desire for a re-inspection. Back and continue hyperlinks 111 allow the user to toggle to previous screens, as well as moving to the next screen in the sequence.

The inspector checklist 160 features the built-in flexibility to accommodate the specific needs of a local jurisdiction or other overall mandates to tailor protocols and determine which requirements are loaded and managed by the COMPATH™ system. The inspector has no control over this aspect of the system. The inspector checklist 160 requirements and those included elsewhere by the COMPATH™ system, and those that are otherwise not included are electronically recorded for auditing purposes by entities having oversight. This feature can only be disengaged or modified by COMPATH™ system or its agents.

Figure 11:
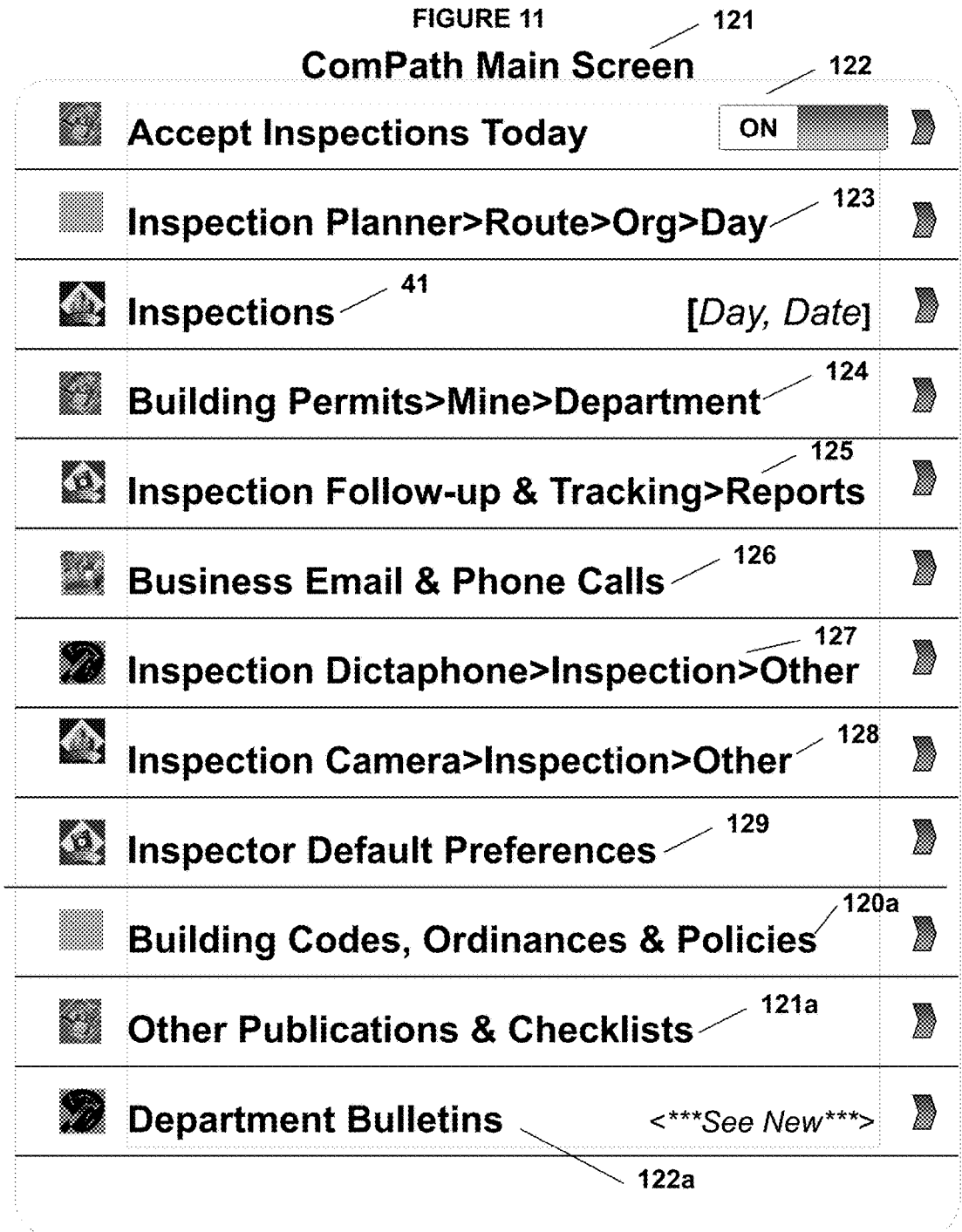
FIG. 11 is a screen shot view of a main opening screen. This screen allows the user to navigate through key tasks encountered in the course of performing the duties of a field inspector.

FIG. 11 is a screen shot view of COMPATH™ system main screen 121 of the field inspector application 10b. This COMPATH™ system main screen 121 allows the user to navigate through key tasks encountered in the course of performing the duties of a field inspector. These key tasks make the duties of the inspector much more efficient, thereby saving time that can be applied to the inspections 41.

The Accept Inspections Today 122 hyperlink is typically switched in the "ON" mode. This means that inspections 41 can be added for the current day until they fill out all of the available time slots. Once the time slots for the current day are filled inspection reservations spill into the following day, or a day and time in the future designated by the contractor. If the Accept Inspections Today 122 hyperlink is switched "OFF", no inspections 41 are accepted for the current day, or are channeled to other designated inspectors. This period of not accepting inspections 41 will be extended if the inspector has blocked out times when he/she is scheduled to not be working.

The Inspection Planner>Route>Org>Day 123 hyperlink generally allows the jurisdiction inspector to edit or otherwise rearrange inspections 41 in a more optimal route. This can be done on the current or any future days where inspections 41 are reserved. The function of the screen will be discussed in more detail in FIG. 13.

The Inspections 41 hyperlink invokes the inspections 41 that are laid out for the current day. The functions of this screen will be explained in FIG. 13.

The Building Permits>Mine>Department 124 hyperlink provides instant access to all building permits in the jurisdiction database. This is useful when an inspector is driving around and sees an unfamiliar building and questions whether or not it has a building permit. This utility simply allows a quick search of the system for issued building permits. The "Mine" element of the Building Permits>Mine>Department 124 hyperlink only includes permits that the inspector has interacted with in some capacity, including those for which he/she has performed inspections 41.

The Inspection Follow-up & Tracking Reports 125 hyperlink provides a list of all inspections 41 that have been performed by the inspector over a specified period that require follow-up interactions with the project. The "Tracking" embedded hyperlink in the Inspection Follow-up & Tracking Reports 125 hyperlink flags projects that have problems or that have been disapproved and have pre-set follow-up dates. The "Reports" embedded hyperlink in the Inspection Follow-up & Tracking Reports 125 hyperlink provides strict access to all inspection reports associated with building jurisdiction inspections 41.

Business E-mail & Phone Calls 126 hyperlink provides an interface that includes a directory of all business associated e-mail addresses and phone numbers. The e-mail client includes letterhead and official scripting for messages that he combines on keyboard input by the inspectors.

The Inspection Dictaphone>Inspection>Other 127 hyperlink as a general Dictaphone for recording messages on any subject as the inspector completes his daily duties. The "Inspection" embedded hyperlink in the Inspection Dictaphone>Inspection>Other 127 hyperlink provides a database of all audio files that are associated with jurisdiction inspections 41 of the completed by jurisdiction inspectors. The "Other" embedded hyperlink in the Inspection Dictaphone>Inspection>Other 127 hyperlink is a folder for other audio files relating to important jurisdiction business. The user may define folders in this category.

The Inspection Camera>Inspection>Other 128 hyperlink is a digital camera that can be used for general purposes. The "Inspection" embedded hyperlink in the Inspection Camera>Inspection>Other 128 hyperlink provides access to a database of pictures associated with jurisdiction inspections 41. The "Other" embedded hyperlink in the Inspection Camera>Inspection>Other 128 hyperlink is a folder for other pictures relating to important jurisdiction business. The user may define folders in this category.

The Inspector Default Preferences 129 hyperlink allows the inspector to change personal settings in the COMPATH™ system to suit his personal work preferences. Examples include but are not limited to work schedule, alarm settings, building codes under his/her purview, contact information, e-mail stationary, some report scripting of contact information, and inspection territory boundaries. The Inspector Default Preferences 129 does not allow the inspector to edit inspection requirements or other critical performance measures for any project or defined work duties. These types of edits are only allowed by the administrative authority.

The Building Codes, Ordinances & Policies 120a hyperlink provides access to all building codes, jurisdiction ordinances, policies, and interpretations that the inspector needs to carry out his or her duties. Ordinances and policies are inserted within the code to embellish the code or requirement that it may modify.

The Other Publications and Checklists 121a hyperlink provides building jurisdiction publications and also a reference library of documents that can help the inspector perform his or her duties. Checklists can be accessed for a given building project and can be e-mailed in paper or electronic form to the contractor, if for some reason he or she needs copies.

The Department Bulletins 122a, hyperlink is just a means of circulating important bulletins and policies to jurisdiction employees. A window informs the inspector when new additions have been made.

Figure 12:
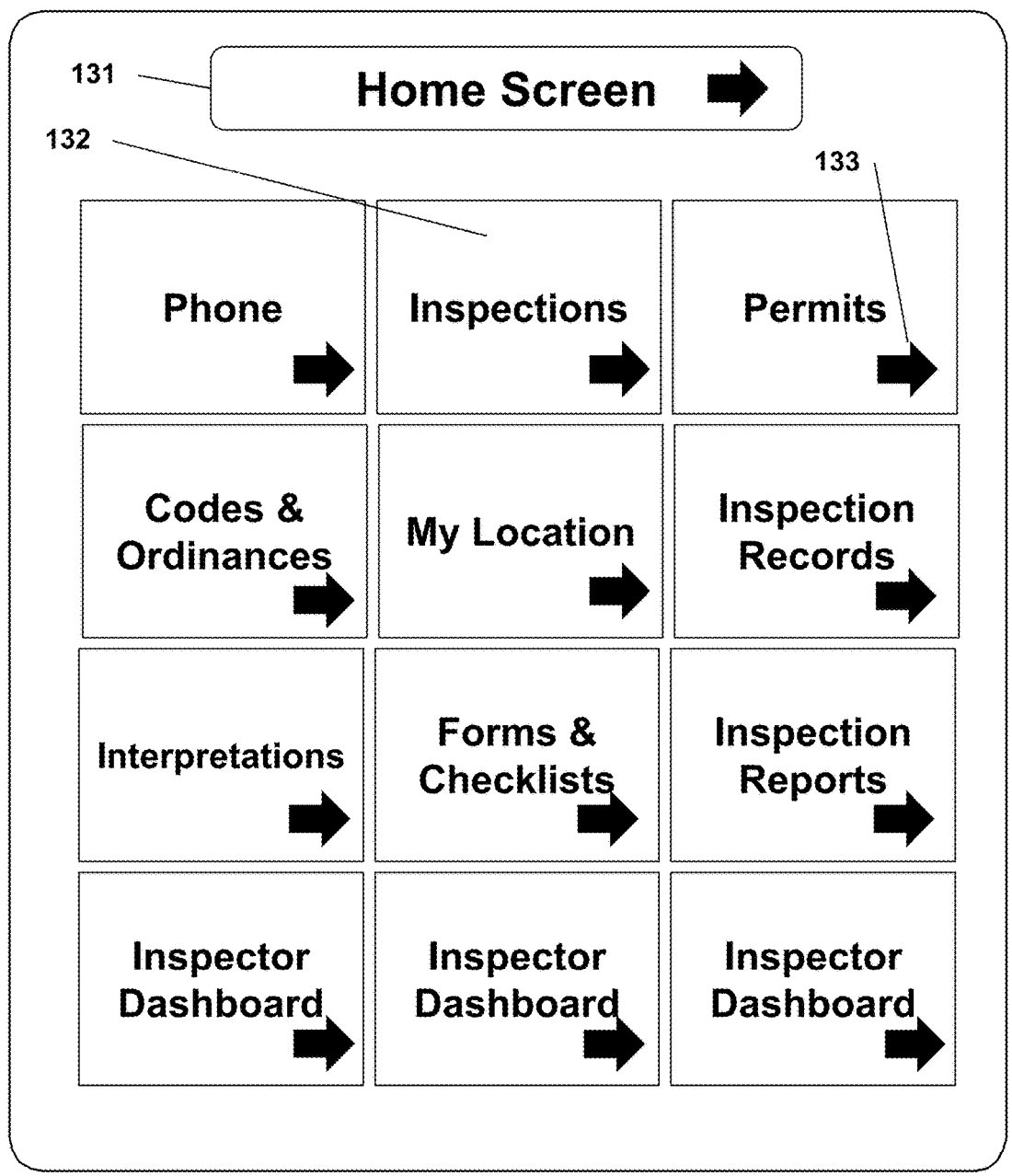
FIG. 12 is a screen shot view of a main navigation screen for the COMPATH™ system and is an optional interface style to the layout of FIG. 11 that can be selected. This screen is further described in FIGS. 13, 14, and 15.

FIG. 12 is a screen shot view of the main navigation S9reen that provides system navigation 130 for the COMPATH™ system. This is the main screen in an alternate series of interface screens, FIGS. 13, 14, and 15 that can be selected by the user. Sub-screens referenced by each radio button underlay and are the same for both alternative interface main screens. A point of reference 131 field provides the user with a reminder of where a selection has been made that reflects the current screen view. This screen provides t led category selectors 132 or hyperlink buttons that provide access to and invoke sub-screens with information and system functions under the selected categories. This screen is designed to accommodate and maximize the ability of users to comfortably use finger, other manual or voice manipulation for making selections. Conventional screen hyperlinks in handheld computers with small screens do not adequately accommodate the imprecision of finger selection because of the small size of the hyperlinks that must be expanded prior to effective use. System navigation 130 does not require this step because system activators are pre-sized to better approach the range of finger sizes through the required motions to invoke actions from the system.

The hyperlink buttons are depressed by the finger or voice command and the finger is slid onto a drop-down screen that includes sub-screen selections. The user must maintain finger pressure 130a during this phase. As the finger moves over the choices or command is activated, it makes the selections illuminate with a different color, indicating an active selection that can be made by lifting the finger or other activation device or other command activation. When the an hyperlink button is activated on the main activation screen and after the pull-down screen 134 appears the color of the remaining buttons is dimmed or another means is activated to show the de-emphasis of the remaining hyperlink buttons. The activated hyperlink button then becomes more prominent by virtue of color change or other means to signal that it is an active hyperlink button to the user. Lift finger activation 132a of the selection occurs when the finger is lifted. The titles within the hyperlink buttons are meant only as examples and are not limited to those shown.

Figure 13:
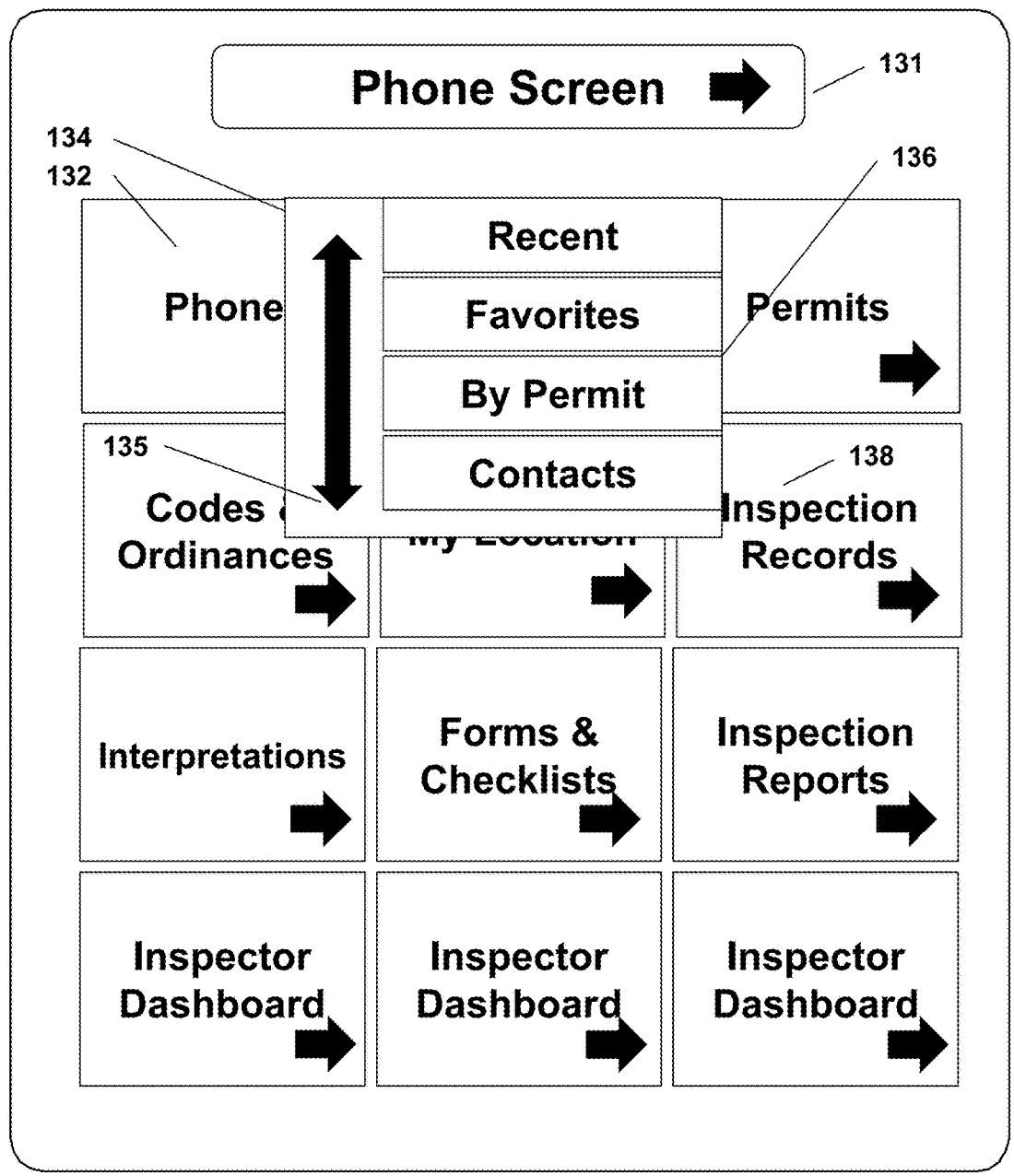
FIG. 13 is a screen shot view of a main navigation screen for the COMPATH™ system, showing a pull-down, finger activated selection field for phone contact options.

FIG. 13 is another screen shot view of the main navigation screen (FIG. 12) for the COMPATH™ system, showing a pull-down, finger activated selection field for phone contact options. The finger activators 133 or hyperlinks are activated by finger pressure, a stylus pen, voice activation or other means. As finger pressure, a stylus pen, voice activation or other means is applied, a pull-down screen 134 appears where selections can be made. The scroller 135 allows the scroller options 136 to scroll up and down to the extent of the options that are included.

As the finger pressure, a stylus pen, voice activation or other means, is applied, the emphasized selections 137 are visually changed in appearance by illumination or other means. In this case, the text color is changed. At the same time, the other deemphasized selections 138 become deemphasized and this is depicted by a reduction in color or other means to indicate to the user that they are deemphasized selections 138 that are not selected. These selections may also be made using voice activation or other means.

Once pressure is applied or the button is otherwise actuated, emphasized selections 137 are indicated by greater illumination or other means. This selection may also be made using voice activation or other means of selection. At the same time, as the stylus or finger is slid over and through the scroller options 136 where those selections where pressure is not applied become deemphasized and are depicted by a change in color or other means to indicate that they are deemphasized selections 138

Figure 14:
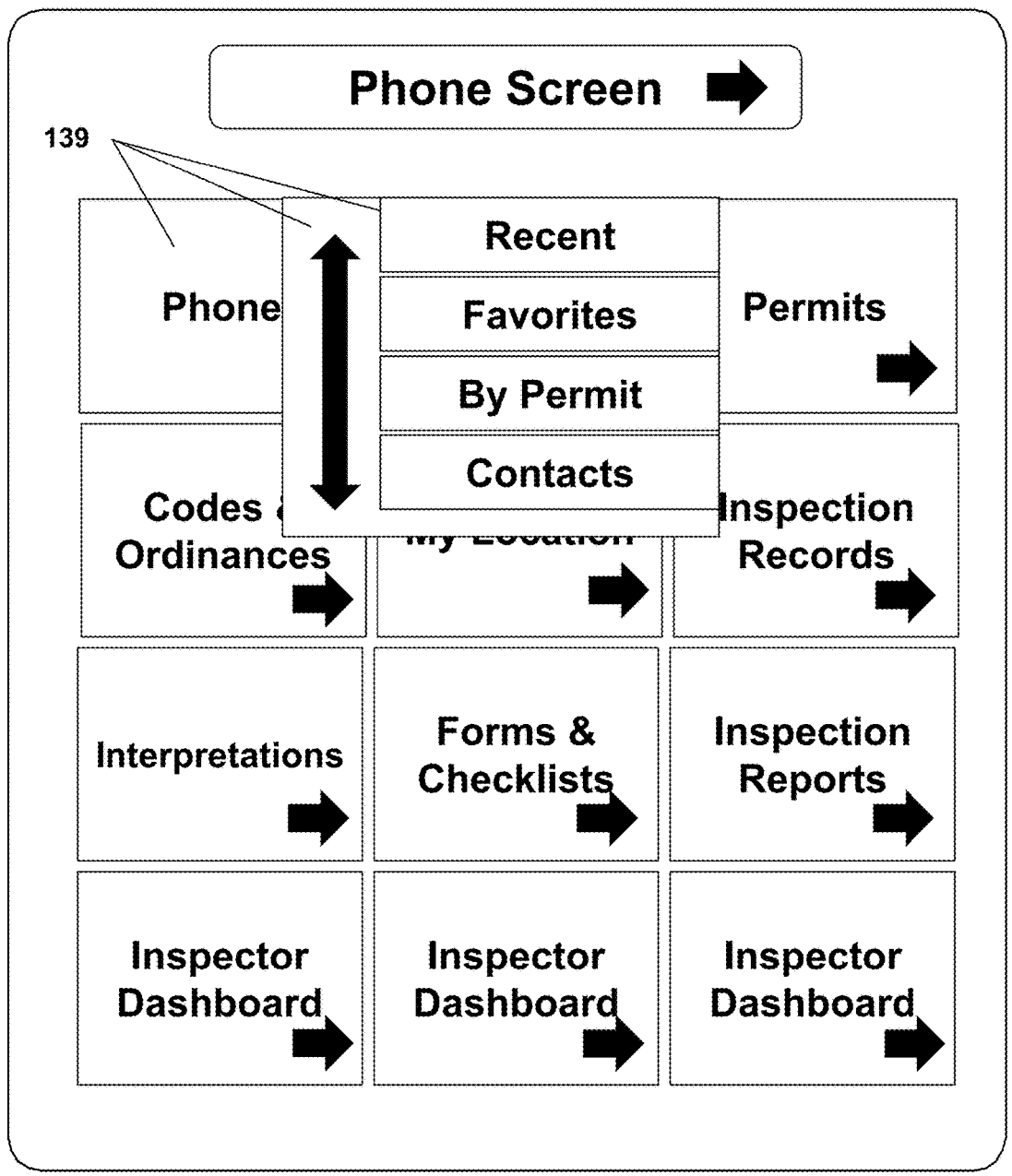
FIG. 14 is a screen shot view of a main navigation screen for the COMPATH™ system, showing a pull-down, finger activated selection field for phone contact options. This particular selection will list recent incoming and outgoing calls on the system.

FIG. 14 is a screen shot view of the main navigation screen for the COMPATH™ system, showing a pull-down, finger activated selection field or pull-down screen 134 for phone contact options. This particular selection is an example of how the physical process activates selections and in this case will list all recent incoming and outgoing calls on the system. At this point, the user makes a finger slide selection 139 by decreasing finger or stylus pressure, or selection through other means, which invokes this selection.

Figure 15:
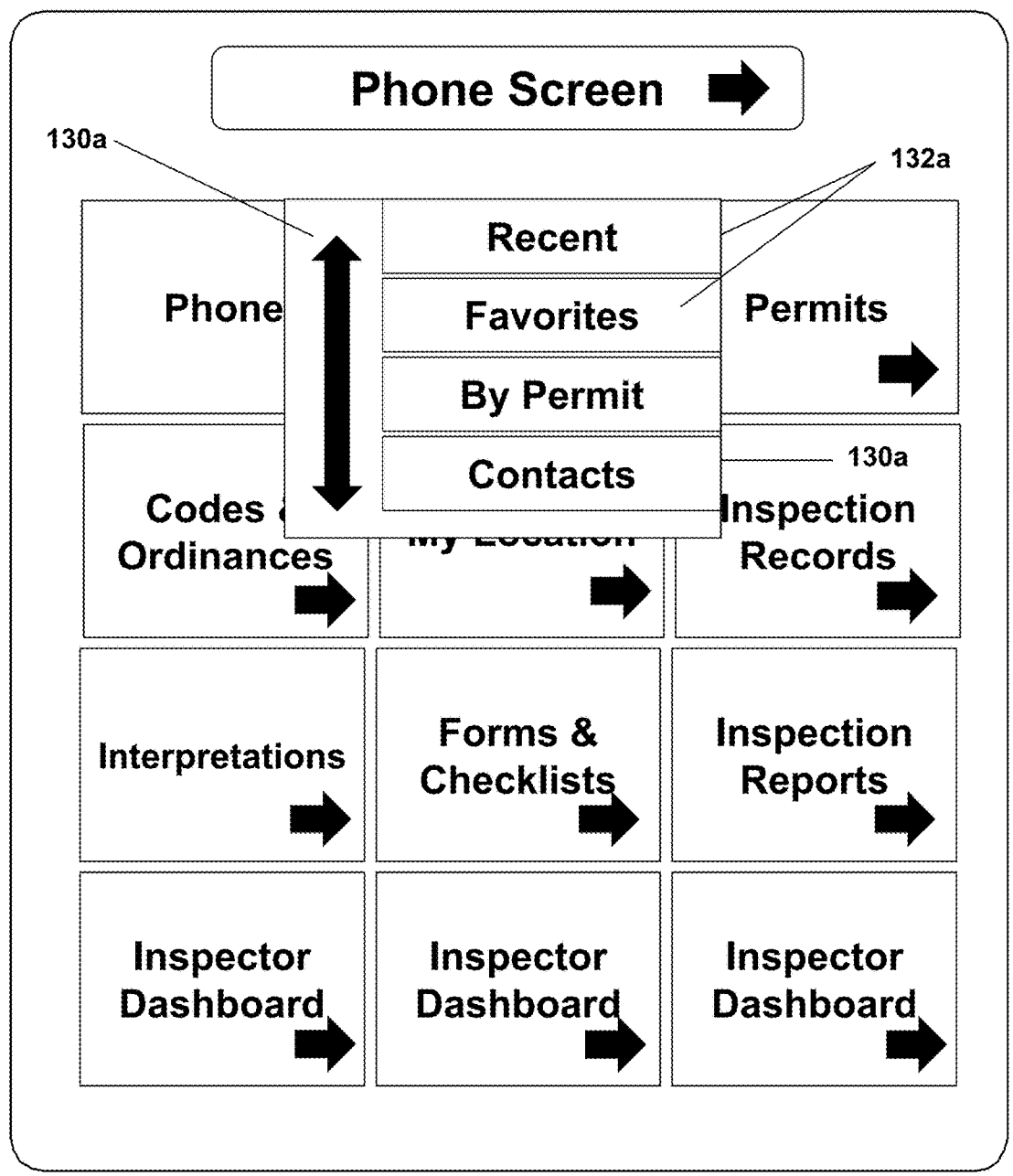
FIG. 15 is a screen shot view of a main navigation screen for the COMPATH™ system, showing a pull-down, finger activated selection field for phone contact options. this particular selection will list numbers favored by the system user to conduct business.

FIG. 15 is a screen shot view of the main navigation screen for the COMPATH™ system, showing a pull-down, finger activated selection field for phone contact options. Finger slide selection 139 can be made for any listed item on the pull-down menu by maintaining pressure until the desired selection is highlighted. The color change indicates activation.

FIG. 16 is a screen shot view of a handheld computing system inspection route organizer and inspection screen. The Schedule Inspections 41 screen is primarily used by inspectors to organize and navigate to scheduled inspections 158. The inspection date 151 field can be used to select the date 95 of inspections 41. The default date 95 is always the current date 95, unless an alternative date 95 is selected by the inspector. The inspection time window 152 is used by the inspector to define the hours of inspection time in the field. If for whatever reason, these inspections 41 are cut short due to changes in the inspection time window 152, inspections 41 are queried out to other inspectors, who might be able to accommodate the added workload. If they decline, automatic e-mails go out to contractors and designers to inform them that the inspections 41 will need to be rescheduled for the following day. All the inspection requests are subject to pre-qualification, which involves the contractor's verification using his or her own inspection specific checklist to pre-verify that key elements of the design are in place and that the building elements in place comply. All of the inspections 41 are automatically arranged by the COMPATH™ system to optimize the travel route to minimize driving and times between inspections 41. This occurs through a mash-up with GPS 150a edit utility 152a with inputs of site addresses, maps, and road routes. An edit utility 152a allows the inspector to manually rearrange the inspections 41 should that become more practical based on his or her judgment.

As the inspector completes inspections 41, for each site stop, he or she can observe color-coded result progress 154. This visually reminds him or her, which inspections 41 have passed or failed, by virtue of the different colors, and the progress that is being made with the day's inspections 41. Examples of colors that may be used but may vary for the same effect are green for completed inspections 41 that pass all of the listed or other non-specified requirements and red for inspections 41 that did not conform to inspection requirements. Real-time record updates 159 are uploaded to the building department server 10, and are accessible to the building official and counter staff. This gives instantaneous results that are also sent via e-mail, immediately following inspections 41, once an inspection report is completed. Once invoked, the hyperlinks for inspection and permit information 157 for each of the listed inspections 41 reveal all of the permit information 153 and inspection records. The inspection priority 155 for each inspection is automatically set but the inspector has the capability to do manual arranging based on needs. Approximate inspection times 151a are listed and if changes occur throughout the day, automatic rerouting, & scheduling 153a adjusts the remaining times and transmits the changes back to the network where counter staff and contractors can be instantly updated. The inspector always has the option to add to or update permit information 153. Inspection type and information 156 allows the inspector to consider the priorities that some inspections 41 have such as concrete footing inspections 41 where concrete pours are typically more time-critical than framing inspections 41, as an example.

FIG. 17 is a screen shot view of an inspector checklist 160 or inspection verifier. Inspection type and information 156 is included to identify the project and inspection being performed. This inspector checklist 160 is customized for each inspection location, a number of which are located throughout the structure and which combine to comprise a complete inspection. Much of the power of this system resides in this screen and the inspector checklist 160. The inspector checklist 160 system requires the inspector to respond to each requirement individually, thereby making him or her responsible and accountable for each active response. The "Note" button on the OK, NOK and Note buttons 163 is automatically invoked when the inspector clicks on NOK 220*c*. This forces him or her to make a response to note why NOK 220*c* or the disapproval was activated and more importantly, to detail the disapproval, which will be included in the inspection report associated with the current inspection.

It is very important to provide inspection identification 161, such that the inspector can readily see which project an inspection he or she is working on. It includes the floor being inspected 167*a*, the inspection selection 165, and locations. The building plan schematic is a key element in activating and toggling back and forth between locations within the building. This allows the inspector to quickly access and compare requirements in different parts of the building as needed. The color-coding 166 of the completed and uncompleted locations gives the inspector an instant assessment of the overall completion level of the inspection. Within the building plan schematics 59, it is sometimes important to have individual wall schematics 211, especially when there is glazing or many more details than can be included effectively in one page of the inspector checklist 160. The individual wall schematics 211 have letter designations and in addition to color coding 166 include notations, noted as "OK" within the schematic 167 designating approval or "NOK" within the schematic 166*a*, indicating that the location has some items on the inspector checklist 160 that have been disapproved. In location 3, the "F" 160*a* and "A" 163*a* hyperlinks provide access to floor 310*a* and attic requirements that adjoin the associated location. The cardinal direction 169 figure orients the inspector in the building, which may be important for navigation, in some cases. The schematic also includes exterior 161*a* and under floor 310*a* hyperlinks that can be activated when the inspector is in a favorable location to view and inspect these areas. Location numbers 165*a* are provided in the schematic for every point where requirements can be readily viewed by the inspector. These requirements are reflected in the inspection checklist, corresponding to the location numbers 165*a*.

The checklist requirements provide a list of those requirements that are typical to all areas. The building inspector must confirm that all requirements are met on this collective checklist prior to issuing approvals 97 for Inspections 41. The inspection selection 165 allows the inspector to choose the code and type of inspection to be performed. The locations are actually indexed redundantly in three places in the pull-down field: the building plan schematic, the location, and the heading to the inspector checklist 160 requirements. The floor level 55 is also indicated as an index of where the inspection is performed. Combining inspection checklist 162 items for multiple codes may be selected or be performed independently of one another. Most inspectors will choose to mingle them together. Detailed requirements 164 represent the individual requirements 107 under the general system or topic of inspection. The detail check off hyperlinks 316*a* allow the inspector to further drill-down on more information about a particular checklist item, which will be explained in greater detail in FIG. 18. Specific inspector checklist 160 items for individual locations within the project 169*a* are listed in a separate area from typical checklist requirements that apply to all locations. OK, NOK and Note buttons 163 provide an opportunity for the inspector to either approve or disapprove each requirement, while also allowing notes to be included in the inspection report. The backup or continue hyperlinks 162*b* allow the inspector to look at the previous screen or continue on to the next screen in the inspection process. A scrolling a requirements hyperlink is used to scroll through requirements as needed to complete inspections 41 within the category.

FIG. 18 is a screen shot view of Detailed Check-off screen 170 or the inspection drill-down verifier. This is an example of a screen that is activated when the detail check off hyperlinks 316*a* for a requirements are employed in the inspector inspection verifier screen from FIG. 17. This screen shows a subset of each general requirement 176 or a more detailed description and approval format for inspectors that need more direction and detailed instructions. It also provides him or her with approval, disapproval, and note buttons 174 for each of these sub-requirements. For those that need an even more detailed explanation of inspection requirements, the details hyperlink 175 can be invoked for an even more detailed illustration of the inspector checklist 160 requirements being inspected. The identification information 171 on the screen and the schematic protocol is the same as FIG. 17. This inspection detail example 173 is meant to be representative of many similar code requirement checklist items that need further elaboration. As such, it illustrates the protocol, and is not limited to a specific and narrowly defined solution to air sealing details. The details hyperlink 175 represents a further explanation of drill-down detail on one requirement depicted in FIG. 18. FIG. 19 describes how one of these checklist items can be even further illuminated. Each of these checklist requirements is a subset of a general requirement checklist item listed in FIG. 17. For the purpose of illustrating the details hyperlink 175, a duct is illuminated in FIG. 19 by invoking the details hyperlink 175 under ductwork joints and seals 178.

FIG. 19 is a screen shot view drill-down duct detail on one requirement depicted in FIG. 18. The identification information 171 on the screen and the schematic protocol is the same as FIGS. 17 and 18. This screen will is an example of an even more detailed treatment of building system details, the requirements and the approval, disapproval and notation radio buttons. It provides links to approved materials for compliance; the importance of the measures; critical areas of attention; commentaries that provide background information and technical documentation; code references to the requirements and a feedback mechanism for the software developers.

This screen has been invoked as a result of activating the details hyperlink 175 for ductwork joints and seals 178 in FIG. 18. Duct sealing requires detailed attention, and the proper way of completing this task in its verification can be somewhat complex. This duct-sealing example 182 shows how this protocol can illustrate, train, and render simpler the process of ensuring compliance. As the user becomes more familiar with applying details, he or she may not need to invoke this screen and may instead shortcut to the more general checklist requirement in FIG. 18. The additional graphics and details 187 illustrate the visual approach to compliance. Quality control details 183 explain in a training manual format how the sealing process is carried out and approved products that can be used in the process. Commentary and manuals 180*a* include information about the referenced detail under consideration and includes a direct bibliography of information that leads the inspector to further edification on the issue. Quality control feedback 181*a* is a mechanism by which inspectors can provide feedback about the system to COMPATH™ system developers. E-mail context-driven forms to contractor 186 are an instantaneous means of supplying certification forms or other relevant form documents to a pre-configured e-mail address associated with the contractor or other responsible parties. Identification, schematic locator, and other referencing information 181 are consistent with FIGS. 17 and 18.

Figure 20:
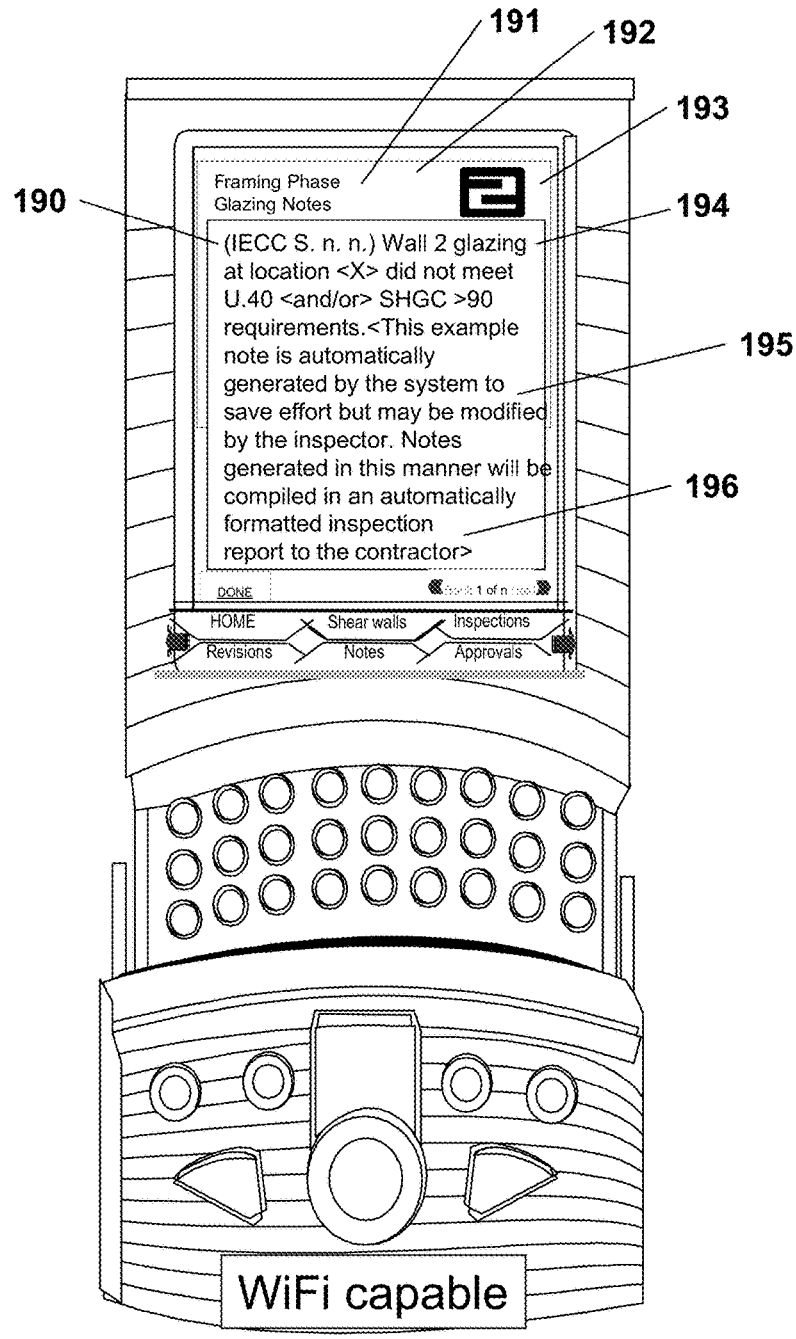
FIG. 20 is a screen shot view of a handheld computing system with an automatically generated inspection note.

FIG. 20 is a screen shot view of an inspector's handheld computing system showing the inspection note generator 192. The inspection note generator 192 has a series of pre-written inspection note clauses of common deficiencies and often-used inspection comments. These clauses save much time in the notation process, when they can simply be inserted and thereby avoid excessive keyboard work by the inspector. This is time-consuming and is intended to abbreviate explanations of problems, thereby decreasing additional questions and communication burdens on the inspector. The inspection note generator 192 automatically inserts the referenced building code 190, code section 191, and code topic 194. A type-in editor 196 is provided to the user to edit comments and add additional text. A locator reference 193 reminds the inspector the location that pertains to the note.

Figure 21:
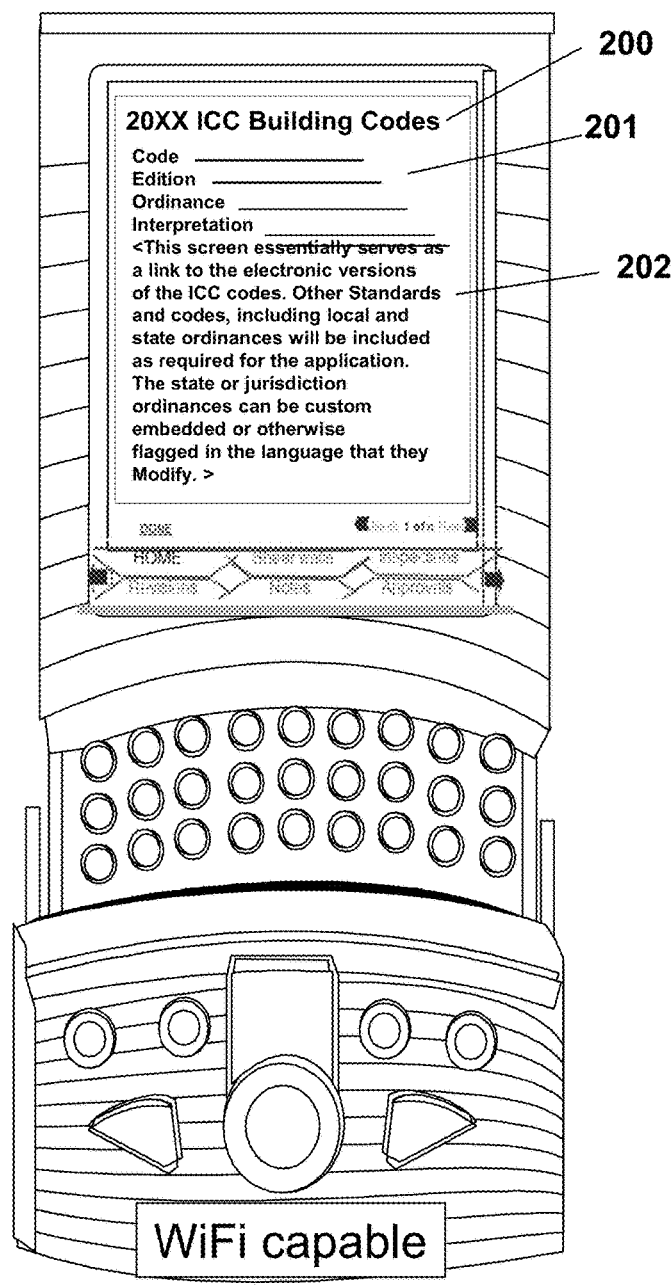
FIG. 21 is a screen shot view of a handheld computing system, illustrating the model codes screen.

FIG. 21 is a screen shot view of a handheld computing system model codes screen 200. This model codes screen 200 provides quick and easy access to the adopted Model Codes and adopted ordinances is an essential key to informing all the stakeholders about the requirements that affect their jobs. This protocol provides readily accessible access to all of the adopted code requirements 99 in a jurisdiction as well as context code section 191 references for each inspection item. The program also cites code sections for any noted deficiency. The timeworn request by contractors to inspectors "Show me where it says that in the code" is easily resolved with this system. Deficiency reports automatically cite the code section 191 to the contractor—which basically eliminates this time consuming task for the inspector and plan reviewer.

There are several noteworthy sections of this screen. In the upper area, the code, edition, section, ordinances, and interpretations 201 fields can be completed by the inspector and essentially drive the information that is provided. The resulting text correlates to the code, edition, section, ordinances, and interpretations 201 fields.

FIG. 22 is a screen shot view of the jurisdiction inspectors glazing inspection screen. The screen has a consistent interface and includes key identifying information 210 as explained previously in FIGS. 17 and 18, and is evident in other screens in the COMPATH™ system. The familiar locator within a building is included in the screen. The schematic locator 213 is a very important element when doing glazing inspections 41, because they are typically done wall by wall. Wall hyperlinks may be clicked separately within the each inspection location, making the glazing for each wall appear with the required glazing. With this process, the inspector has the ability to approve all or individual glazing units 217. Color-coding of different glazing assemblies 212 is also a feature that makes those assemblies that have different specifications stand out from those that are consistent. The differences relate to glazing specifications, particularly glazing area 214 and efficiencies. The system has an ability to approve all or individual glazing units 217 depending on whether it can be determined that all glazing units within a location readily apply with the requirements. When one glazing unit does not apply, the remaining glazing units are typically inspected and approved on an individual basis area. The reference point in the schematic always provides the inspector a general point of reference 131 in the inspection process.

FIG. 23 is another screen shot view of the jurisdiction inspectors glazing inspection screen from FIG. 22. This screen is repeated to show additional details and features of FIG. 22. Solar heat gain coefficients and U-value glazing efficiencies 220 are critical features in determining glazing and associated code compliance. To comply, the glazing assemblies must mirror those listed in the jurisdiction-approved plans and specifications. Prior to the COMPATH™ system, this metric has been very difficult and time-consuming to verify. Consequently, enforcement of glazing requirements has been very poor. Solar heat gain coefficients and U-value glazing efficiencies 220 are extremely important to the overall efficiency of buildings, as is the total glazing area 214 throughout the building. The glazing area 214 total is the sum of the individual glazing areas of each glazing assembly. In the case of our listed glazing assembly example, 4'×5'=20 square feet. Glazing area 214 is critical because it has the highest rate of heat transfer of the building envelope assemblies or external barrier against the outside environment.

The inspector normally checks off each glazing assembly that is presented. If the glazing assembly does not comply, he or she clicks on the NOK 220*c* button and the glazing detail pull-down menus 221 appear. These menus allow for the input of details about alternative glazing that has been installed without building jurisdiction approval. From this information, a determination can be made as to whether overall glazing compliance requirements can be met. When different efficiency values are entered than were specified for the approved glazing assembly, the field calculator for non-complying glazing provides an assessment, using accepted engineering algorithms to compare against the baseline glazing requirements and determines whether overall compliance can still be met. This is reflected in a pass or no pass at the bottom of the glazing detail pull-down menu. This indicates approval or disapproval of the glazing requirements, which in turn indicates an approval or disapproval of the inspection being performed.

FIG. 24 is another screen shot view of the jurisdiction inspectors glazing inspection screen from FIG. 22. This screen is repeated to show additional details and features of FIG. 22. Individual wall schematics 211 maintain a point of reference 131, where the glazing under review resides. A pull-down field of database of glazing products 231 is included in the glazing detail pull-down window. This database includes a product catalog of all known glazing products and their specifications. Selecting glazing characteristics 230 can be carried out utilizing the pull-down fields in the glazing detail pull-down menu. In some cases, the glazing assembly will not be identifiable, but the construction features and materials will be observable. In this case, depending on the building code 77 in force, default efficiency values may be included that reflect those listed in the adopted building code 77 or standard. Glazing that does not comply, can be evaluated using glazing filters 232 in the glazing pull-down menu.

FIG. 25 is another screen shot view of the jurisdiction inspectors glazing inspection screen from FIG. 22. This screen is repeated to show additional details and features of FIG. 22. This screen illustrates the unlisted glazing protocol 240. FIG. 26 shows additional details. If glazing is not identifiable, has no labels, or is site built, the assembly details and materials may then form the basis for assigning code defined default efficiency values 250 that are listed in the reference code, local ordinance or by jurisdiction policy. These values are embedded in the COMPATH™ program by the system administrators. This feature is very valuable in the field, because it can turn a cumbersome disapproval and re-inspection processes into an instantaneous approval if other components are able to compensate to meet the overall energy efficiency requirements. The pass or no pass calculator 251 performs this operation in the background and manifests its results with a PASS or NO PASS in the lower portion of the glazing detail pull-down menu. This is an example of a COMPATH™ system calculation process that will be very attractive to contractors and building inspectors saving a considerable amount of time and resources.

Figure 27:
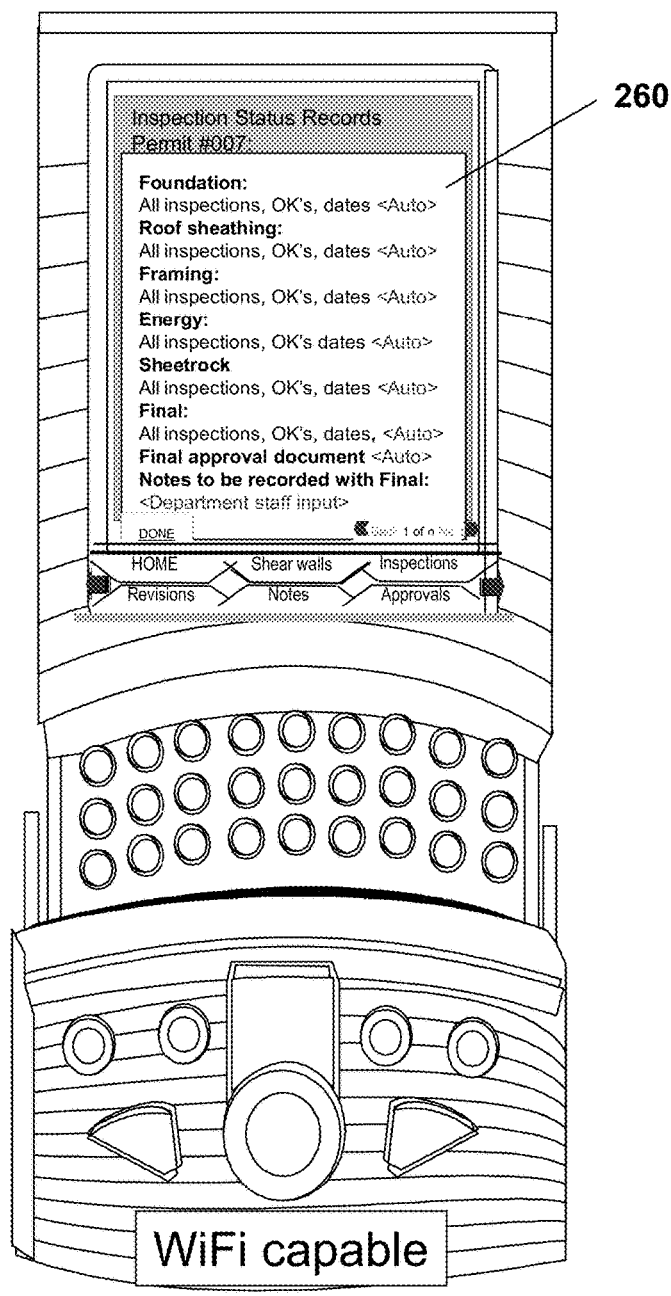
FIG. 27 is a screen shot view of a handheld computing system approval records screen.

FIG. 27 is a screen shot view of a handheld computing system approval records screen. This is a simple screen that provides a list of inspection results for all inspections 41 under a particular building permit or permits. Refer to the screen for the organization and text that can be observed for a typical permitted building construction project. A list of inspection results for a particular building permit 260 is illustrated for a typical building project.

FIG. 28 is a typical COMPATH™ system inspection report that is used by the contractor to resolve violations in preparation for requesting re-inspection. This contractor's pre-framing checklist example 353a has sample information that will vary with virtually every inspection and inspection report. This report has the jurisdiction header, which identifies the jurisdiction having authority over this particular project. It also has identifying information that identifies the permit holder, contact information, permit number, site address, and construction company. The contractor's instructions describe the way in which the pre-framing checklist should be used to reach compliance and initiate a re-inspection of the listed checklist items. Building code 77 identification is listed for each category of checklist requirements. With each checklist requirement, key hyperlinked information is included. The "?" hyperlinks that explain each checklist deficiency elaborate in greater detail the deficiencies and how they can be mitigated. A code reference is also associated with each checklist item providing the underlying code section 191 number and text. In some cases, the checklist item will have an associated product listing that provides a set of instructions for specific products. In some cases, this is an essential part of the fulfillment of the requirement.

This hyperlinked information provides a great deal of clarification for the contractor about the listed deficiencies. With this added commentary, contractors have a reduced need to occupy jurisdiction building inspector's time and by asking questions and seeking clarifications about issues that they do not understand. This frees up more time for the inspector to provide primary attention to performing inspections 41 in a more efficient manner. As the contractor progresses down the checklist item list, he or she will place checks in the checkboxes. All of these boxes must be checked, which indicates that the items have been corrected.

Typically, the inspector will need a means to communicate special comments or requirements to the contractor and this will be recorded in the inspector's notes. An explanation of our report processing is included to explain how, in this case, the contractors pre-framing checklist example is processed and included with the overall inspection records. An inspection request radio button that can only be invoked when all items are approved is normally grayed out and not usable until all the checkboxes are checked, indicating compliance. This process ensures that the contractor has systematically verified that all of the deficiencies have been corrected prior to re-inspection by checking the checkboxes. This makes the re-inspection by the jurisdiction inspector, much more efficient and more likely to result in a re-inspection approval. This saves considerable time on the part of the contractor and the jurisdiction. This conserved time can then be dedicated to more effective, building inspections 41.

FIG. 29 is a typical COMPATH™ system pre-inspection inspection report that is used by the sub-contractor to resolve violations that he or she was responsible by virtue of his or her work on the project. A subcontractor version for pre-framing inspection is completed for the contractor in preparation to qualify for re-inspection. The contractor is responsible for verifying the corrections of the subcontractor and calling for re-inspection. The format of the subcontractor pre-inspection checklist is basically identical to the FIG. 28 version for contractors. The only exception is the OK for contractor radio button at the lower portion of the form.

This sub-contractor's pre-framing checklist example 353a has sample information that will vary with virtually every inspection and inspection report. This report has the jurisdiction header, which identifies the jurisdiction having authority over a particular project. It also has identifying information that identifies the permit holder, contact information, permit number, site address, and construction company. The sub-contractor's instructions describe the way in which the pre-framing checklist should be used to reach compliance and initiate a re-inspection of the listed checklist items. Building code identification is listed for each category of checklist requirements. With each checklist requirement, key hyperlinked information is included. The "?" hyperlinks explain each checklist deficiency by elaborating, in greater detail, the deficiencies and how they can be mitigated. A code reference is also associated with each checklist item, providing the underlying code section 191 number and text. In some cases, the checklist item will have an associated product listing that provides a set of instructions for specific products. In some cases, this is an essential part of the fulfillment of the requirement.

This hyperlinked information provides a great deal of clarification for the sub-contractor about the listed deficiencies. With this added commentary, sub-contractors have a reduced need to occupy the jurisdiction building inspector's time through asking questions and seeking clarifications about issues that they do not understand. This frees up more time for the inspectors to provide their primary attention to performing inspections 41 in a more efficient manner. As the sub-contractor progresses down the checklist item list, he or she will place checks in the checkboxes. All of these boxes must be checked, which indicates that the items have been corrected. The sub-contractor report exclusively benefits the contractor with his or her results and does not interact or request inspections 41 from the jurisdiction. Only the contractor can make the re-inspection request.

Typically, the inspector will need a means to communicate special comments or requirements to the contractor and, indirectly to the subcontractor, and this will be recorded in the inspector's notes. An explanation of report processing is included to explain how, in this case, the sub-contractors pre-framing checklist example is processed and is included with the overall inspection records. An OK for the contractor request radio button can only be invoked when all checklist items are approved. It is normally grayed out and not usable until all the checkboxes are checked, indicating compliance. This process ensures that the sub-contractor has systematically verified to the contractor that all of the deficiencies have been corrected prior to the re-inspection. This makes the re-inspection by the jurisdiction inspector, much more efficient and more likely to result in a re-inspection approval. This saves considerable time on the part of the contractor, subcontractor, and the jurisdiction. This conserved time can then be dedicated to more effective, building inspections 41.

FIG. 30 is an example of an other-than-English language subcontractor pre-inspection checklist. The only difference between FIG. 30 and FIG. 29 is the translation of this particular example into an other-than-English version. All the descriptions included under FIG. 28 apply to FIG. 30. The purpose for translating the subcontractor's pre-inspection checklist example into other languages is that many sub-contracting crews do not speak English. This creates a major problem in providing instructions that vary from project to project. Often times the language barrier results in poor regulation compliance. The result is a major problem with failed inspections 41, adversely affecting the time and resources required to perform re-inspections. These checklists provide very specific, customized checklist requirements that are readily understandable by other than English-speaking subcontracting crews. This makes contractors, much more efficient with these workers in gaining desired results and, in turn, creating more efficiency between the contractor and jurisdiction inspector.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

I claim:

1. A computer-implemented method to provide efficiency and accountability during an inspector visit of a construction project by providing an audit mechanism to check inspector and construction representative performance, the method comprising:

receiving at a jurisdiction server from a designer computing device plans and/or specifications for a structure to be built at the construction project, wherein the plans and/or specifications include one or more building components inspected upon construction by the jurisdiction based on the jurisdiction's regulations governing construction details and/or practices;

matching at the jurisdiction server the jurisdiction's regulations to building components within the plans and/or specifications to determine targets for inspection by the jurisdiction to verify compliance with the jurisdiction's regulations, wherein matching comprises:

presenting an interface with a list of building components available for inspection identified from the received plans and/or specifications;

receiving from a representative of the jurisdiction a subset of the building components available for inspection that are relevant to the jurisdiction for verification via an inspection; and adding the subset of building components to the targets for inspection to be inspected by the inspector, wherein determining targets for inspection according to the preceding steps causes a level of plan review detail to be adjustable to reflect policy of the jurisdiction and accommodates political and program mandates that vary by jurisdiction;

selecting building components of the structure from the determined targets for inspection during an inspection visit by an inspector working on behalf of the jurisdiction;

before an inspection request is submitted and before detecting that the inspector arrives to inspect the selected building components of the structure, presenting to a contractor, subcontractor, or design professional, referred to here as a construction representative, who is working on the construction project, using a construction representative computing device that accesses the jurisdiction server, an interface that presents information describing the selected building components so that the construction representative can perform a pre-inspection quality control check;

receiving from the construction representative on the construction representative computing device input indicating compliance or non-compliance of each of the selected building components;

response to an indication that the construction representative has fixed any non-compliant building components indicated by the pre-inspection quality control check, communicating compliance of the selected building components to the jurisdiction server, and presenting at the construction representative computing device an inspection request interface that could not be accessed prior to finishing the pre-inspection quality control check to request a visit to the construction project from the inspector;

displaying on an inspector computing device that accesses the jurisdiction server, a user interface that shows a list of inspection requests assigned by the jurisdiction server to the inspector;

after determining based on the inspector's input that the inspector is conducting a visit to the construction project following the construction representative's pre-inspection quality control check, presenting to the inspector on the inspector computing device an interface that presents information describing the selected building components;

receiving from the inspector on the inspector computing device during the visit input indicating compliance or non-compliance of each of the selected building components, submitting from the inspector computing device to the jurisdiction server the received input from the inspector; and generating on the jurisdiction server or inspector computing device a detailed inspection report for the construction representative that indicates non-compliant building components determined by the inspector and the applicable regulation violated by each non-compliant building component, wherein the jurisdiction server will not permit the construction representative to access the inspection request interface again until the construction representative completes a new pre-inspection quality control check of the non-compliant building components.

2. The method of claim 1 wherein each regulation includes a hyperlink to a descriptive section and stock explanation of one or more conditions for compliance with the regulation, and wherein regulations may include at least one of local ordinances, model building codes, model building standards, statutes, state codes, federal agency regulations, state agency regulations, federal building codes, policies, and other types of specifications.

3. The method of claim 1 wherein selecting building components for inspection comprises providing a graphical interface that includes each inspection location, in which each location further includes both requirements applicable to all areas of the building, and requirements that are system selected to apply only at the specific location where the inspector currently is located to provide a visual roadmap of the inspector's location in the building and how he proceeds through each building location to complete the inspection.

4. The method of claim 1 further comprising storing an inspector profile that includes one or more areas of expertise of the inspector, and assigning an inspector to inspect the building components based on comparing the stored areas of expertise and the plans and/or specifications for the building components.

5. The method of claim 1 further comprising generating a report upon completion of inspection for delivery to one or more construction representatives.

6. The method of claim 1 further comprising providing a user interface to one or more construction representatives that allows viewing areas inspected by the inspector and specific reasons for compliance or noncompliance of the building components inspected.

7. The method of claim 1 wherein selecting building components for inspection comprises examining a history of items failing inspection for past projects and prioritizing those building components most likely to be noncompliant.

8. The method of claim 1 wherein selecting building components for inspection comprises accessing a stored indication of areas of expertise of each inspector and prioritizing those building components of the construction project that most closely match each inspector's areas of expertise.

9. A computer system for facilitating building inspections and providing prioritization and accountability to the inspection process, the system comprising:
 a jurisdiction server configured to manage construction projects performed in a jurisdiction and to communicate with computing devices used by construction representatives, inspectors, and designers associated with construction projects performed in the jurisdiction;
 a designer computing device that communicates with a plan and/or specification input component of the jurisdiction server to receive plans and/or specifications from a designer associated with a construction project, wherein the plans and/or specifications include one or more building components inspected upon construction by the jurisdiction to verify compliance with the jurisdiction's regulations governing construction details and/or practices, wherein the plan and/or specification input component: 1) matches the jurisdiction's regulations to building components within the plans and/or specification to determine targets for inspection by the jurisdiction to verify compliance with the jurisdiction's regulations and 2) selects building components of the structure from determined targets for inspection during an inspection visit by an inspector working on behalf of the jurisdiction, wherein matching comprises:
  presenting an interface with a list of building components available for inspection identified from the received plans and/or specifications;
  receiving from a representative of the jurisdiction a subset of the building components available for inspection that are relevant to the jurisdiction for verification via an inspection; and
  adding the subset of building components to the targets for inspection to be inspected by the inspector,
  wherein determining targets for inspection according to the preceding steps causes a level of plan review detail to be adjustable to reflect policy of the jurisdiction and accommodates political and program mandates that vary by jurisdiction;
 a construction representative computing device that includes a construction representative interface for displaying inspection information from the jurisdiction server to one or more contractors, subcontractors, or design professionals, referred to here as construction representatives, associated with the construction project, wherein the construction representative interface includes: 1) an interface that presents information describing the selected building components so that the construction representative can perform a pre-inspection quality control check, 2) an interface to receive from the construction representative input indicating compliance or non-compliance of each of the selected building components, 3) an inspection request interface to request a visit to the construction project from the inspector, that could not be accessed prior to the construction representative finishing the pre-inspection quality control check, and 4) a post-inspection interface that presents specific indications of one or more building components of the construction project that were flagged for remediation during a recent inspection;
 an inspector computing device having an inspector interface for displaying prioritization and scheduling information to an inspector that indicates a schedule for the inspector to visit multiple inspection job sites for inspection and selected building components of each construction project on which the inspector is to focus; and
 an inspection code library associated with the jurisdiction server that contains statutory building code information for the jurisdiction for comparison with building plans and/or specifications and for generating reports indicating noncompliant building components of a construction project;
 wherein the computer system acts as an additional party to the interaction between the inspector and construction representative that behaves in a systematic, consistent manner with clearly defined expectations to hold both the inspector and construction representative accountable by providing an audit mechanism to check inspector and construction representative performance.

10. The system of claim 9 wherein the inspection code library further contains one or more exception policies that indicate modifications by an authority having jurisdiction (AHJ) to a building code used across multiple jurisdictions.

11. The system of claim 9 wherein the inspector interface is a web-based interface accessible via a network connection of the portable networked device.

12. The system of claim 9 wherein the plan and/or specification input component receives input from the designer to input plans and/or specifications reflecting code and other regulation compliance related to a particular construction project, and wherein the system provides feedback to the designer indicating one or more potential problem areas of the plans and/or specification.

13. The system of claim 9 wherein the portable networked device includes one or more devices selected from the group consisting of a smartphone, a tablet computer, and a laptop computer carried by the inspector and wherein the portable networked device runs an application that implements the system.

14. The system of claim 9 wherein the construction representative interface component includes a reference with each building component flagged for remediation to a specific building code provision associated with a cause for failure of the building component to pass inspection.

15. The system of claim 9 wherein the inspector interface component includes stock text associated with each building component and potential code violation from which the inspector can select for inclusion in an inspection report.

16. A computer-readable storage medium comprising instructions for controlling a computer system to schedule inspector schedules in a jurisdiction, wherein the instructions, upon execution, cause a processor to perform actions comprising:

receiving at a jurisdiction server one or more requests from one or more construction representative computing devices to inspect one or more construction projects in a jurisdiction, wherein the jurisdiction server does not allow a contractor, subcontractor, or design professional, referred to here as a construction representative, to request an inspection until the construction representative has performed a pre-inspection quality control check;

receiving at the jurisdiction server a list of available inspectors employed by the jurisdiction to inspect construction projects for compliance with local building codes;

determining at the jurisdiction server an assignment of construction projects to inspectors that matches at least one inspector to each construction project that has requested an inspection;

scheduling at the jurisdiction server each inspector's daily schedule to indicate which of the multiple locations within targeted buildings each inspector should be present at during a time period and communicating with one or more inspector computing devices to inform each inspector of a suggested schedule determined by the jurisdiction server for finalization by the inspector; and during a visit to a construction project, providing the inspector via one of the one or more inspector computing devices with a prioritized list in a user interface of building components within the construction project on which the inspector should focus during the visit, wherein the computer system acts as an additional party to the interaction between the inspector and construction representative that behaves in a systematic, consistent manner with clearly defined expectations to hold both the inspector and construction representative accountable by providing an audit mechanism to check inspector and construction representative performance.

17. The medium of claim 16 wherein the list of available inspectors includes an indication of one or more areas of expertise of each inspector and wherein determining an assignment matches inspectors to construction projects based on the indicated areas of expertise.

18. The medium of claim 16 wherein the list of available inspectors includes an indication of one or more geographical areas within the jurisdiction to which each inspector is assigned.

* * * * *